United States Patent
Dorne et al.

(10) Patent No.: US 11,314,773 B2
(45) Date of Patent: Apr. 26, 2022

(54) DATA PERMISSIONING THROUGH DATA REPLICATION

(71) Applicant: Palantir Technologies Inc., Palo Alto, CA (US)

(72) Inventors: Jeremy Dorne, Washington, DC (US); Jeffrey Bagdis, Washington, DC (US); Hirsh Jain, New York, NY (US); Mitchell Skiles, New York, NY (US); Armando Belardo, Washington, DC (US); Joseph Schiavone, New York, NY (US); Joshua Zweig, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 192 days.

(21) Appl. No.: 16/782,602

(22) Filed: Feb. 5, 2020

(65) Prior Publication Data

US 2021/0173851 A1 Jun. 10, 2021

Related U.S. Application Data

(60) Provisional application No. 62/944,570, filed on Dec. 6, 2019.

(51) Int. Cl.
*G06F 16/00* (2019.01)
*G06F 16/27* (2019.01)
(Continued)

(52) U.S. Cl.
CPC .......... *G06F 16/27* (2019.01); *G06F 16/2455* (2019.01); *G06F 16/9532* (2019.01)

(58) Field of Classification Search
CPC .. G06F 16/27; G06F 16/9532; G06F 16/2455; G06F 16/2452
See application file for complete search history.

(56) References Cited

U.S. PATENT DOCUMENTS 6,339,769 B1 * 1/2002 Cochrane .......... G06F 16/24539
2007/0038596 A1 2/2007 Pizzo et al.
(Continued)

FOREIGN PATENT DOCUMENTS

EP 3832481 6/2021

OTHER PUBLICATIONS

Official Communication for European Patent Application No. 20212031.7 dated May 4, 2021, 9 pages.
(Continued)

*Primary Examiner* — Alexander Khong
(74) *Attorney, Agent, or Firm* — Knobbe Martens Olson & Bear LLP

(57) ABSTRACT

A data querying system is disclosed that provides improved computer functionality that enables efficient permissioning and querying of specific portions of a data table, such that users (e.g., based on user roles or user attributes) are only allowed access to specific portions (e.g., particular data items/rows, and particular data items attributes/columns) of the data. The system advantageously provides efficient and improved querying and permissioning of specific portions of a data table through replication of the data table, or portions of the data table, and does not require permissioning of each individual cell of the data table. Further, the data table replication, querying, and permissioning techniques of the present disclosure, according to various implementations, advantageously integrate with a wide variety of data table query or search services to provide improved functionality, efficiency, and data permissioning.

20 Claims, 13 Drawing Sheets

(51) Int. Cl.
  *G06F 16/2455*   (2019.01)
  *G06F 16/9532*   (2019.01)

(56) References Cited

U.S. PATENT DOCUMENTS

2010/0262625 A1\* 10/2010 Pittenger .............. G06F 21/604
                                                          707/783
2018/0089320 A1    3/2018 Hanson et al.
2021/0117424 A1\*  4/2021 Yao ................... G06F 16/24544

OTHER PUBLICATIONS

Kang et al., "Achieving Database Security Through Data Replication: The Sintra Phototype", Naval Research Laboratory Information Technology Division, Jan. 1, 1994, pp. 1-11.

\* cited by examiner

| | Querying User | Group Access Permissions | Sensitivity Permissions | Default Permissions |
|---|---|---|---|---|
| | User 1 | — | — | $P_0$ For All Groups |
| | User 2 | G1 | P1 | |
| | User 3 | G2 | P1 | |
| | User 4 | G1, G2 | P1 | |
| | User 5 | G3 | P2 | |

602 → Example Input Query:
   Return Personnel that have had a Medical Visit 604 → Example Generated Query:
   Query Table $P_2$ for Personnel where Medical Visit = Y 606 → Example Query Responses:

| User 1 | None | | | | | (No $P_2$ Permissions) |
|---|---|---|---|---|---|---|
| User 2 | None | | | | | (No $P_2$ Permissions) |
| User 3 | None | | | | | (No $P_2$ Permissions) |
| User 4 | None | | | | | (No $P_2$ Permissions) |
| User 5 | ID | Group | Status | Location | Name | Address | Medical Visit |
| | 678 | 3 | Active | Site 4 | Ann | 2 East | Y |

FIG. 6A

610 → Example Input Query:

Return Personnel that have Name James or John

612 → Example Generated Query:

Query Table $P_1$ for Personal where Name= James or John

614 → Optional Further Generated Query:

Query Table $P_2$, in Set of Initial Response, where Name = James or John

616 → Example Query Responses:

| User 1 | None (no $P_1$ Permissions ) | | | | | | |
|---|---|---|---|---|---|---|---|
| User 2 | ID | Group | Status | Location | Name | Address | Medical Visit |
|  | 123 | 1 | Active | Site 1 | James | 23 St. | NULL |
| User 3 | ID | | | | | | Medical Visit |
|  | 456 | 2 | Active | Site 3 | James | 21 Ave | NULL |
| User 4 | ID | | | | | | Medical Visit |
|  | 123 | 1 | Active | Site 1 | James | 23 St. | NULL |
|  | 456 | 2 | Active | Site 3 | James | 21 Ave | NULL |
| User 5 | ID | | | | | | Medical Visit |
|  | 567 | 3 | Inactive | Site 2 | John | Apt 4 | NULL |
|  |  |  |  |  |  | 620 → [or N] |  |

618 points to User 5 row.

FIG. 6B

630 → Example Input Query:

Return Personnel that are Active

632 → Example Generated Query:

Query Table $P_0$ for Personnel where Status = Active

634 → Optional Further Generated Query:

Query Table $P_1$ and $P_2$, in Sets of Responses, for Personnel where Status = Active 636 → Example Query Responses:

| | ID | Group | Status | Location | Name | Address | Medical Visit |
|---|---|---|---|---|---|---|---|
| User 1 | 123 | 1 | Active | Site 1 | NULL | NULL | NULL |
| | 345 | 2 | Active | Site 2 | NULL | NULL | NULL |
| | 456 | 2 | Active | Site 3 | NULL | NULL | NULL |
| | 678 | 3 | Active | Site 4 | NULL | NULL | NULL |

User 2: 638 → [Same as User 1] or

| | ID | Group | Status | Location | Name | Address | Medical Visit |
|---|---|---|---|---|---|---|---|
| 640 | 123 | 1 | Active | Site 1 | James | 23 St. | NULL |
| | 345 | 2 | Active | Site 2 | NULL | NULL | NULL |
| | 456 | 2 | Active | Site 3 | NULL | NULL | NULL |
| | 678 | 3 | Active | Site 4 | NULL | NULL | NULL |

User 5: 642 → [Same as User 1] or

| | ID | Group | Status | Location | Name | Address | Medical Visit |
|---|---|---|---|---|---|---|---|
| | 123 | 1 | Active | Site 1 | NULL | NULL | NULL |
| | 345 | 2 | Active | Site 2 | NULL | NULL | NULL |
| | 456 | 2 | Active | Site 3 | NULL | NULL | NULL |
| 644 | 678 | 3 | Active | Site 4 | Ann | 2 East | Y |

FIG. 6C

DATA PERMISSIONING THROUGH DATA REPLICATION

BACKGROUND

Computer data systems generally include methods and mechanisms for controlling access to resources by users or devices. Such access control may generally be referred to as "permissioning". Examples of methods and/or mechanisms for permissioning include file attributes, access control lists, and/or the like.

SUMMARY

Permissioning may be associated with resources, users, devices, roles, attributes, and/or combinations of the foregoing and/or the like. For example, permissioning may be associated with resources, including but not limited to data items (e.g., data files, data objects, etc.), data item properties or attributes (generally referred to herein as "data item attributes"), groups of data items, data tables or portions of data tables, databases or portions of databases, computer systems, devices, and/or the like. As further examples, permissions may be associated with users, devices, roles, and/or attributes, including but not limited to individual users, groups of users, user accounts, user devices, use cases, user roles, types of users, user or device attributes, and/or the like. As noted above, examples of methods and/or mechanisms for permissioning include file attributes, access control lists, and/or the like.

A computer data system may include a large volume of data, including a large number (e.g., thousands, tens or hundreds of thousands, millions, tens or hundreds of millions, billions, or more) of data items and respective associated data item attributes. In an implementation, the data (or a portion of the data) may be generally represented in a data table, where each row of the data table corresponds to a particular data item, and each column of the data table corresponds to a data item attribute.

It may be useful and desirable to apply permissioning to the data such that users (e.g., based on user roles, user attributes, etc.) are only allowed access to specific portions (e.g., particular data items attributes/columns) of the data in the data table. However, enforcing such granular permissioning on a single data table may require, for example, access controls associated with each individual cell of the data table, or the smallest/lowest level of data on which permissions are set. Such an access control scheme may create inefficiencies in the querying of the data table, because permissions associated with each user may need to be determined for each individual cell of the table when the table is queried. Such detailed determinations may be necessary, e.g., under the scenario in which permissions are associated with each individual cell of the table, to ensure that access to the data of the table is sufficiently controlled such that users lacking necessary permissions are not granted access to data they do not have sufficient permissions for (e.g., particular columns of data of the data table).

The data querying system (generally referred to herein as "the system") of the present disclosure provides improved computer functionality that enables efficient permissioning and querying of specific portions of a data table, e.g., such that users (e.g., based on user roles, user attributes, etc.) are only allowed access to specific portions (e.g., particular data items/rows, and particular data items attributes/columns) of the data. As described in further detail herein, the system advantageously provides efficient and improved querying and permissioning of specific portions of a data table, according to various implementations, through replication of the data table, or portions of the data table, and does not require permissioning of each individual cell of the data table. Further, the data table replication, querying, and permissioning techniques of the present disclosure, according to various implementations, advantageously integrate with a wide variety of data table query or search services to provide improved functionality, efficiency, and data permissioning.

According to various implementations, the permissions functionality of the system of the present disclosure may be enabled by a query writing service and a replicated table data layer, as further described herein. The portions of the data table associated with different permissions may be overlapping and/or hierarchically organized (e.g., based on data sensitivity levels, use cases, etc.). In various cases, users may be associated with particular sensitivity level permissions based on, e.g., their role, device, account, attributes, the like, and/or combinations of the foregoing and/or other information as described herein.

The system of the present disclosure accomplishes the above-described example permissioning of specific portions of a data table, according to various implementations.

For example, in a first example implementation, the data table to be queried/accessed is replicated into multiple (or one or more) replicated data tables, wherein each of the replicated data tables corresponds to a different sensitivity level. As described below, although the term "replicated data tables" is used in the present disclosure for clarity purposes, in most instances the "replicated data tables" do not replicate every aspect of the data table in its entirety. Rather, the structure or schema of the data table may be replicated in whole or in part in the replicated data tables, and the data of the data table may similarly be replicated in whole or in part in the replicated data tables. For example, each of the replicated data tables may maintain a schema that overlaps or extends that of the data table. However, certain data of the replicated data tables may be modified based on the respective different sensitivity levels associated with each of the replicated data tables. In the present example implementation, the system includes a query writing service that receives an input search query associated with the data table from a user (or device, and/or the like), determines sensitivity level permissions associated with the input search query (e.g., based on the user, the user's role, a device, an account, one or more attributes, metadata associated with data of the system, the like, and/or combinations of the foregoing and/or other information as described herein), and generates one or more new queries (generally referred to herein as a "replicated-data-table query") based on the determined sensitivity permissions. The replicated-data-table query includes an identification of the particular replicated data table associated with the determined sensitivity level permissions. The replicated-data-table query is then passed to a search service, which search service then executes that query on the replicated table data layer. Results of the replicated-data-table query are passed back to the query writing service. Depending on the type of input search query, and the determined sensitivity level permissions, the query writing service may then initiate one or more additional replicated-data-table queries identifying other replicated data tables of the replicated table data layer, and further identifying rows corresponding to results of the previous replicated-data-table queries. The query writing service then combines or aggregates the results of all the replicated-data-table queries, restores unique identifiers associated with each of the rows of the combined/aggregated results if needed, and provides a response to the input search query.

In a second example implementation, the rows of the data table to be queried/accessed are replicated multiple (or one or more) times in a single replicated data table, wherein each of the replicated sets of rows corresponds to a different sensitivity level. In the present implementation, the functionality of the system is similar to that described above in reference to the first example implementation, with the following differences (among others described herein): Instead of multiple replicated data tables, a single replicated data table contains all the replicated data corresponding to each of the sensitivity levels. Thus, the replicated table data layer is structured differently. Additionally, the replicated-data-table query generated by the query writing service includes an identification of the particular set of rows, or the particular row(s), of the replicated data table associated with the determined sensitivity level permissions. Further, sensitivity permissions, in combination with group access permissions, associated with users may be further defined such that each user has access to every row of the data table at exactly one sensitivity level. Accordingly, the query writing service may generate the replicated-data-table query for the applicable rows of the replicated table data layer.

Advantageously, according to various implementations, due to the functionality of the query writing service, a user of the system may not be aware that there is anything other than the data table being queried. In other words, the query writing service may, invisibly from the perspective of the user, handle translating input search queries to function with the replicated table data layer (e.g., by way of the search service), and then translating results from queries of the table data layer back to what would be expected of a user who believes they are only querying the data table directly. Further, as described herein, the combination of the functionality of the query writing service and the replicated table data layer enables the system to function with an existing search service. In combination, the various aspects of the system, according to various implementations, provides efficient and improved querying and permissioning of specific portions of a data table.

Additionally, the present disclosure includes multiple example interactive graphical user interfaces that provide functionality that takes advantage of the permissioning functionality described. Accordingly, in various implementations, large amounts of data and permissions are automatically and dynamically calculated interactively in response to user inputs, and the calculated data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various implementations of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of information and may enable a user to more quickly access, navigate, assess, and digest such information than previous systems.

In some implementations, data may be presented in graphical representations, such as visual representations, such as timelines, charts, and graphs, where appropriate, to allow the user to comfortably review the large amount of data and to take advantage of humans' particularly strong pattern recognition abilities related to visual stimuli. In some implementations, the system may present aggregate quantities, such as totals, counts, and averages.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various implementations of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various implementations of the disclosure provide significant improvements over such technology. Additionally, various implementations of the present disclosure are inextricably tied to computer technology. In particular, various implementations rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various implementations cannot reasonably be performed by humans alone, without the computer technology upon which they are implemented. Further, the implementation of the various implementations of the present disclosure via computer technology enables many of the advantages described herein, including more efficient interaction with, and presentation of, various types of electronic data.

In certain implementations, a computer-implemented method of data permissioning comprises, by one or more processors executing program instructions: receiving an input search query associated with a data table; determining sensitivity permissions associated with the input search query; based on the determined sensitivity permissions, generating a replicated-data-table query; providing the replicated-data-table query to a search service for execution of the replicated-data-table query on a replicated table data layer generated based on the data table; receiving a response from the search service including results of the replicated-data-table query; and providing a response to the input search query based on at least the results of the replicated-data-table query.

Moreover, the methods of the preceding paragraph can be implemented together with any combination of the following features, among others: by the one or more processors executing program instructions: generating the replicated table data layer, wherein generating the replicated table data layer comprises: determining sensitivity levels associated with the data table; generating two or more replicated data tables, wherein: a first replicated data table of the two or more replicated data tables corresponds to a first sensitivity level of the determined sensitivity levels, and a second replicated data table of the two or more replicated data tables corresponds to a second sensitivity level of the determined sensitivity levels. generating the replicated table data layer further comprises: associating first sensitivity level permissions, corresponding to the first sensitivity level, with the first replicated data table; and associating second sensitivity level permissions, corresponding to the second sensitivity level, with the second replicated data table; each of the two or more replicated data tables comprises a schema that overlaps or extends that of the data table; the data table comprises a plurality of columns, at least a first set of columns of the plurality of columns is associated with the first sensitivity level, at least a second set of columns of the plurality of columns is associated with the second sensitivity level, and generating the replicated table data layer further comprises: in the first replicated data table associated with the first sensitivity level permissions, setting data values of the second set of columns to null values; and in the second replicated data table associated with the second sensitivity level permissions, setting data values of the second set of columns to match those of the data table.

Moreover, the methods of the preceding paragraphs can be implemented together with any combination of the following features, among others: the replicated table data layer comprises: two or more replicated data tables, wherein: a first replicated data table of the two or more replicated data tables corresponds to a first sensitivity level of a plurality of sensitivity levels associated with the data table, and a second replicated data table of the two or more replicated data tables corresponds to a second sensitivity level of the plurality of sensitivity levels associated with the data table. first sensitivity level permissions, corresponding to the first sensitivity level, are associated with the first replicated data table, and second sensitivity level permissions, corresponding to the second sensitivity level, are associated with the second replicated data table; each of the two or more replicated data tables comprises a schema that overlaps or extends that of the data table, the data table comprises a plurality of columns, at least a first set of columns of the plurality of columns is associated with the first sensitivity level, at least a second set of columns of the plurality of columns is associated with the second sensitivity level, in the first replicated data table associated with the first sensitivity level permissions, data values of the second set of columns are set to null values, and in the second replicated data table associated with the second sensitivity level permissions, data values of the second set of columns match those of the data table.

Moreover, the methods of the preceding paragraphs can be implemented together with any combination of the following features, among others: the determined sensitivity permissions include the first sensitivity level permissions, and wherein generating the replicated-data-table query comprises: determining to query the first replicated data table; and including, in the replicated-data-table query, a query of the first replicated data table.

Moreover, the methods of the preceding paragraphs can be implemented together with any combination of the following features, among others: the determined sensitivity permissions include the first and second sensitivity level permissions, and wherein generating the replicated-data-table query comprises: determining to query the first and second replicated data tables; and including, in the replicated-data-table query, queries of the first and second replicated data tables.

Moreover, the methods of the preceding paragraphs can be implemented together with any combination of the following features, among others: by the one or more processors executing program instructions: based on the results of the replicated-data-table query, and further based on the sensitivity permissions, generating a second replicated-data-table query; providing the second replicated-data-table query to the search service for execution of the second replicated-data-table query on the replicated table data layer; receiving a second response from the search service including results of the second replicated-data-table query; and aggregating the results of the replicated-data-table query and the results of the second replicated-data-table query, wherein the response to the input search query is further based on at least the results of the replicated-data-table query and the results of the second replicated-data-table query; the replicated-data-table query includes a query of the first replicated data table associated with the first sensitivity level, and the second replicated-data-table query includes a query of the second replicated data table associated with the second sensitivity level; the second replicated-data-table query includes primary keys associated with results of the replicated-data-table query.

Moreover, the methods of the preceding paragraphs can be implemented together with any combination of the following features, among others: aggregating the results of the replicated-data-table query and the results of the second replicated-data-table query comprises: joining the results of the replicated-data-table query and the results of the second replicated-data-table query into a single table; and associating, with corresponding rows of the single table, unique identifiers (also referred to herein as "unique IDs" or "IDs") matching those of the corresponding rows from the data table.

Moreover, the methods of the preceding paragraphs can be implemented together with any combination of the following features, among others: the sensitivity permissions comprise a hierarchical set of sensitivity permissions; the sensitivity permissions are associated with a user providing the input search query.

Moreover, the methods of the preceding paragraphs can be implemented together with any combination of the following features, among others: by the one or more processors executing program instructions: generating the replicated table data layer, wherein generating the replicated table data layer comprises: determining sensitivity levels associated with the data table; generating a replicated data table including two or more replicated sets of rows, wherein: a first replicated set of rows of the two or more replicated sets of rows corresponds to a first sensitivity level of the determined sensitivity levels, and a second replicated set of rows of the two or more replicated sets of rows corresponds to a second sensitivity level of the determined sensitivity levels; generating the replicated table data layer further comprises: associating first sensitivity level permissions, corresponding to the first sensitivity level, with the first replicated set of rows; and associating second sensitivity level permissions, corresponding to the second sensitivity level, with the second replicated set of rows; each of the two or more replicated sets of rows comprises a schema that overlaps or extends that of the data table; the data table comprises a plurality of columns, at least a first set of columns of the plurality of columns is associated with the first sensitivity level, at least a second set of columns of the plurality of columns is associated with the second sensitivity level, and generating the replicated table data layer further comprises: in the first replicated set of rows associated with the first sensitivity level permissions, setting data values of the second set of columns to null values; and in the second replicated set of rows associated with the second sensitivity level permissions, setting data values of the second set of columns to match those of the data table; each of the sets of replicated rows comprises all of the rows of the data table, or a same number of rows as the number of rows in the data table.

Moreover, the methods of the preceding paragraphs can be implemented together with any combination of the following features, among others: the replicated table data layer comprises: a replicated data table including two or more replicated sets of rows, wherein: a first replicated set of rows of the two or more replicated sets of rows corresponds to a first sensitivity level of a plurality of sensitivity levels associated with the data table, and a second replicated set of rows of the two or more replicated sets of rows corresponds to a second sensitivity level of the plurality of sensitivity levels associated with the data table; first sensitivity level permissions, corresponding to the first sensitivity level, are associated with the first replicated set of rows, and second sensitivity level permissions, corresponding to the second sensitivity level, are associated with the second replicated set of rows; each of the two or more replicated sets of rows comprises a schema that overlaps or extends that of the data table, the data table comprises a plurality of columns, at least a first set of columns of the plurality of columns is associated with the first sensitivity level, at least a second set of columns of the plurality of columns is associated with the second sensitivity level, in the first replicated set of rows associated with the first sensitivity level permissions, data values of the second set of columns are set to null values, in the second replicated set of rows associated with the second sensitivity level permissions, data values of the second set of columns match those of the data table, and each of the sets of replicated rows comprises all of the rows of the data table, or a same number of rows as the number of rows in the data table.

Moreover, the methods of the preceding paragraphs can be implemented together with any combination of the following features, among others: the determined sensitivity permissions include the first sensitivity level permissions, and wherein generating the replicated-data-table query comprises: determining to query the first replicated set of rows; and including, in the replicated-data-table query, a query of the first replicated set of rows.

Moreover, the methods of the preceding paragraphs can be implemented together with any combination of the following features, among others: the determined sensitivity permissions include the first and second sensitivity level permissions, and wherein generating the replicated-data-table query comprises: determining to query the first and second replicated sets of rows; and including, in the replicated-data-table query, queries of the first and second replicated sets of rows.

Moreover, the methods of the preceding paragraphs can be implemented together with any combination of the following features, among others: by the one or more processors executing program instructions: resolving unique identifiers associated with the results of the replicated-data-table query by querying or causing querying of a unique identifier lookup table; the unique identifier lookup table includes matches between unique identifiers associated with rows of the data table, and corresponding rows of the replicated data table.

Moreover, the methods of the preceding paragraphs can be implemented together with any combination of the following features, among others: the replicated data table includes a column storing unique identifiers matching unique identifiers associated with corresponding rows of the data table; by the one or more processors executing program instructions: removing a primary key column from the results of the replicated-data-table query.

Moreover, the methods of the preceding paragraphs can be implemented together with any combination of the following features, among others: the sensitivity permissions are defined for each user with respect to all group access permissions; the sensitivity permissions comprise a hierarchical set of sensitivity permissions; the sensitivity permissions are associated with a user providing the input search query.

Additional implementations of the disclosure are described below in reference to the appended claims, which may serve as an additional summary of the disclosure.

In various implementations, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

FIGS. 6A-6C illustrate example operation of the system, according to various implementations of the present disclosure.

DETAILED DESCRIPTION

I. Overview

Figure 1A:
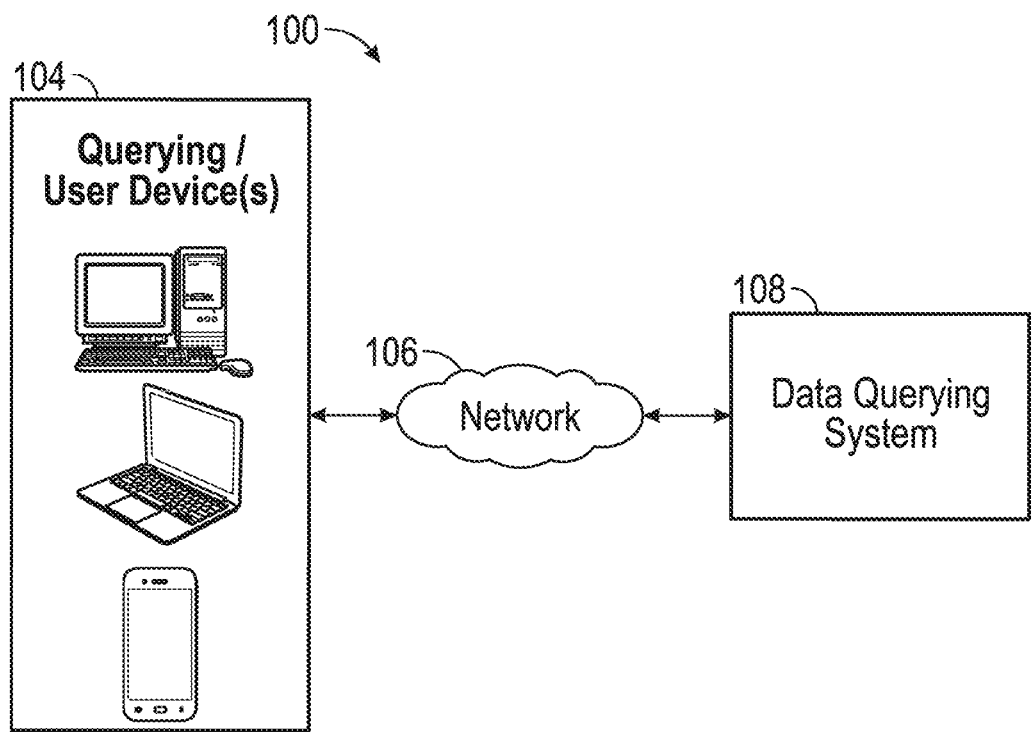
FIG. 1A illustrates a block diagram of an example operating environment in which one or more aspects of the present disclosure may operate, according to various implementations of the present disclosure.

As noted above, computer data systems generally include methods and mechanisms for controlling access to resources by users or devices. Such access control may generally be referred to as "permissioning". Permissioning may be associated with resources, users, devices, roles, attributes, and/or combinations of the foregoing and/or the like. For example, permissioning may be associated with resources, including but not limited to data items (e.g., data files or data objects), data item properties or attributes (generally referred to herein as "data item attributes"), groups of data items, data tables or portions of data tables, databases or portions of databases, computer systems, devices, and/or the like. As further examples, permissions may be associated with users, devices, roles, and/or attributes, including but not limited to individual users, groups of users, user accounts, user devices, use cases, user roles, types of users, user or device attributes, and/or the like. Examples of methods and/or mechanisms for permissioning include file attributes, access control lists, and/or the like.

A computer data system may include a large volume of data, including a large number (e.g., thousands, tens or hundreds of thousands, millions, tens or hundreds of millions, billions, or more) of data items and respective associated data item attributes. In an implementation, the data (or a portion of the data) may be generally represented in a data table, where each row of the data table corresponds to a particular data item, and each column of the data table corresponds to a data item attribute.

It may be useful and desirable to apply permissioning to the data such that users (e.g., based on user roles or user attributes) are only allowed access to specific portions (e.g., particular data items attributes/columns) of the data in the data table. However, enforcing such granular permissioning on a single data table may require, for example, access controls associated with each individual cell of the data table, or the smallest/lowest level of data on which permissions are set. Such an access control scheme may create inefficiencies in the querying of the data table, because permissions associated with each user may need to be determined for each individual cell of the table when the table is queried. Such detailed determinations may be necessary, e.g., under the scenario in which permissions are associated with each individual cell of the table, to ensure that access to the data of the table is sufficiently controlled such that users lacking necessary permissions are not granted access to data they do not have sufficient permissions for (e.g., particular columns of data of the data table).

The data querying system (generally referred to herein as "the system") of the present disclosure provides improved computer functionality that enables efficient permissioning and querying of specific portions of a data table, e.g., such that users (e.g., based on user roles or user attributes) are only allowed access to specific portions (e.g., particular data items/rows, and particular data items attributes/columns) of the data. As described in further detail herein, the system advantageously provides efficient and improved querying and permissioning of specific portions of a data table, according to various implementations, through replication of the data table, or portions of the data table, and does not require permissioning of each individual cell of the data table. Further, the data table replication, querying, and permissioning techniques of the present disclosure, according to various implementations, advantageously integrate with a wide variety of data table query or search services to provide improved functionality, efficiency, and data permissioning.

According to various implementations, the permissions functionality of the system of the present disclosure may be enabled by a query writing service and a replicated table data layer, as further described herein. The portions of the data table associated with different permissions may be overlapping and/or hierarchically organized (e.g., based on data sensitivity levels or use cases). In various cases, users may be associated with particular sensitivity level permissions based on, e.g., their role, device, account, attributes, the like, and/or combinations of the foregoing and/or other information as described herein.

The system of the present disclosure accomplishes the above-described example permissioning of specific portions of a data table, according to various implementations.

For example, in a first example implementation, the data table to be queried/accessed is replicated into multiple (or one or more) replicated data tables, wherein each of the replicated data tables corresponds to a different sensitivity level. As described below, although the term "replicated data tables" is used in the present disclosure for clarity purposes, in most instances the "replicated data tables" do not replicate every aspect of the data table in its entirety. Rather, the structure or schema of the data table may be replicated in whole or in part in the replicated data tables, and the data of the data table may similarly be replicated in whole or in part in the replicated data tables. For example, each of the replicated data tables may maintain a schema that overlaps or extends that of the data table. However, certain data of the replicated data tables may be modified based on the respective different sensitivity levels associated with each of the replicated data tables. In the present example implementation, the system includes a query writing service that receives an input search query associated with the data table from a user (or device, and/or the like), determines sensitivity level permissions associated with the input search query (e.g., based on the user, the user's role, a device, an account, one or more attributes, metadata associated with data of the system, the like, and/or combinations of the foregoing and/or other information as described herein), and generates one or more new queries (generally referred to herein as a "replicated-data-table query") based on the determined sensitivity permissions. The replicated-data-table query includes an identification of the particular replicated data table associated with the determined sensitivity level permissions. The replicated-data-table query is then passed to a search service, which search service then executes that query on the replicated table data layer. Results of the replicated-data-table query are passed back to the query writing service. Depending on the type of input search query, and the determined sensitivity level permissions, the query writing service may then initiate one or more additional replicated-data-table queries identifying other replicated data tables of the replicated table data layer, and further identifying rows corresponding to results of the previous replicated-data-table queries. The query writing service then combines or aggregates the results of all the replicated-data-table queries, restores unique identifiers associated with each of the rows of the combined/aggregated results if needed, and provides a response to the input search query.

In a second example implementation, the rows of the data table to be queried/accessed are replicated multiple (or one or more) times in a single replicated data table, wherein each of the replicated sets of rows corresponds to a different sensitivity level. In the present implementation, the functionality of the system is similar to that described above in reference to the first example implementation, with the following differences (among others described herein): Instead of multiple replicated data tables, a single replicated data table contains all the replicated data corresponding to each of the sensitivity levels. Thus, the replicated table data layer is structured differently. Additionally, the replicated-data-table query generated by the query writing service includes an identification of the particular set of rows, or the particular row(s), of the replicated data table associated with the determined sensitivity level permissions. Further, sensitivity permissions, in combination with group access permissions, associated with users may be further defined such that each user has access to every row of the data table at exactly one sensitivity level. Accordingly, the query writing service may generate the replicated-data-table query for the applicable rows of the replicated table data layer.

Advantageously, according to various implementations, due to the functionality of the query writing service, a user of the system may not be aware that there is anything other than the data table being queried. In other words, the query writing service may, invisibly from the perspective of the user, handle translating input search queries to function with the replicated table data layer (e.g., by way of the search service), and then translating results from queries of the table data layer back to what would be expected of a user who believes they are only querying the data table directly. Further, as described herein, the combination of the functionality of the query writing service and the replicated table data layer enables the system to function with an existing search service. In combination, the various aspects of the system, according to various implementations, provides efficient and improved querying and permissioning of specific portions of a data table.

Additionally, the present disclosure includes multiple example interactive graphical user interfaces that provide functionality that takes advantage of the permissioning functionality described. Accordingly, in various implementations, large amounts of data and permissions are automatically and dynamically calculated interactively in response to user inputs, and the calculated data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

II. Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

III. Example Operating Environment

FIG. 1A illustrates a block diagram of an example operating environment 100 in which one or more aspects of the present disclosure may operate, according to various implementations of the present disclosure. The operating environment 100 may include one or more user devices 104, and a data querying system 108. The various devices and systems of the operating environment 100 may communicate with one another, e.g., via a communications network 106, as illustrated.

Various example user devices 104 are shown in FIG. 1A, including a desktop computer, a laptop, and a mobile phone, each provided by way of illustration. In general, the user devices 104 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 104 may execute an application (e.g., a browser, a stand-alone application, etc.) that allows a user to access and interact with interactive graphical user interfaces as described herein.

The network 106 may include any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some implementations, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

As noted above, a computer data system may include a large volume of data, including a large number (e.g., thousands, tens or hundreds of thousands, millions, tens or hundreds of millions, billions, or more) of data items and respective associated data item attributes. In an implementation, the data (or a portion of the data) may be generally represented in a data table, where each row of the data table corresponds to a particular data item, and each column of the data table corresponds to a data item attribute. Thus, for example, if the data items correspond to personnel in an organization, a portion of the data may be conceptualized as shown in an example data table 202 of FIG. 2.

In general, the data querying system 108 (also generally referred to herein as "the system") may comprise a computing system, including a plurality of data stores, databases, memories, processors, network interfaces, and the like, by which input search queries for querying a data table are received and replied to, using a query writing service and a replicated table data layer (which is generated based on the data table), as described herein according to various implementations. For example, input search queries may be received from a user device 104 (either directly or indirectly, e.g., as via another computer device handling interactive graphical user interface operations), wherein a user of the user device 104 is interacting with an interactive graphical user interface to obtain data from the data table. The user's interactions may include a specific, user-defined input search queries (e.g., as written in a database query language) of the data table, or they may include interactions with user interface elements based upon which that the user device 104 and/or the data querying system 108 generate input search queries. Responses provided by the data querying system 108 may then be provided to the user of the user device 104 in the form of a raw data table, or as part of user interface elements of the interactive graphical user interface. Examples of such raw data table responses are described in reference to FIGS. 6A-6C, and examples of such interactive graphical user interfaces are described in reference to FIGS. 7A-7C.

As described below, the data querying system 108 provides innovative permissioning functionality in conjunction with search query response functionality. In particular, the system provides improved computer functionality that enables efficient permissioning and querying of specific portions of a data table, e.g., such that users (e.g., based on user roles, user attributes, etc.) are only allowed access to specific portions (e.g., particular data items/rows, and particular data items attributes/columns) of the data. Further details and examples regarding the implementations, operation, and functionality, including various interactive graphical user interfaces, of the various components of the example operating environment 100 are described herein in reference to various figures.

IV. Example Data Querying System

Figure 1B:
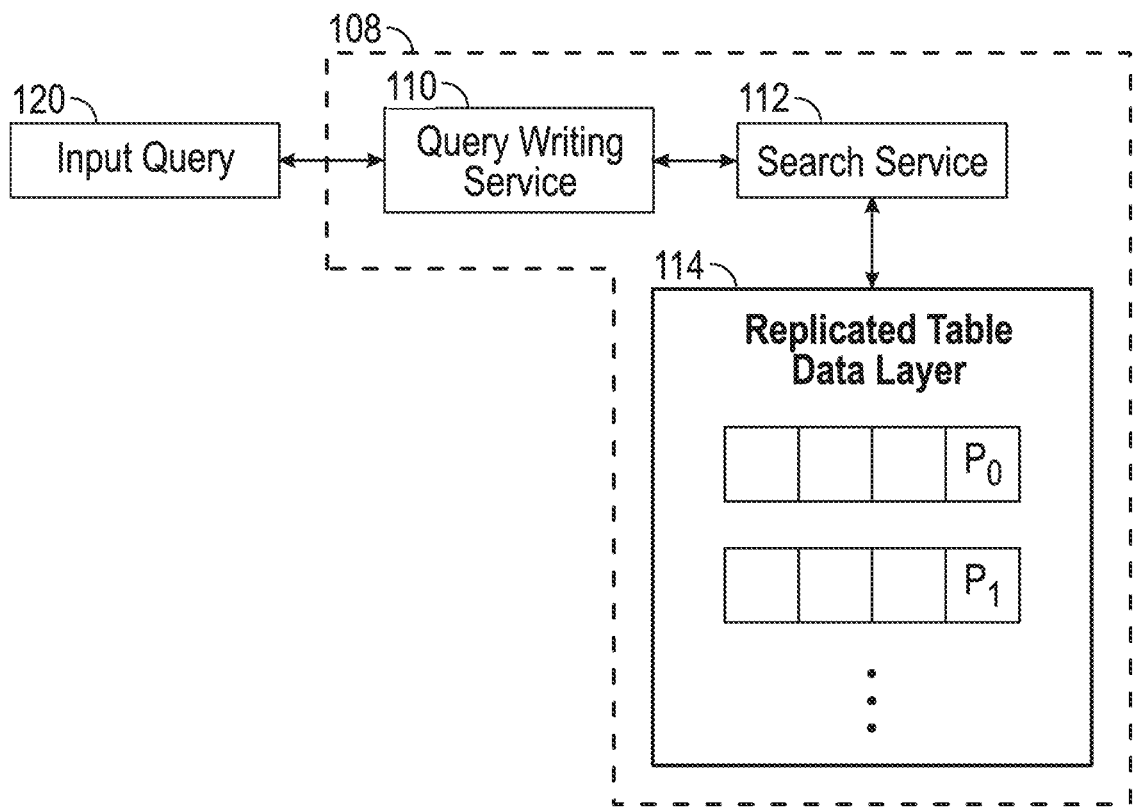
FIG. 1B illustrates a block diagram including an example implementation of a data querying system, according to various implementations of the present disclosure.

FIG. 1B illustrates a block diagram including an example implementation of the data querying system 108, according to various implementations of the present disclosure. In particular, the data querying system 108 can be used in the example operating environment 100 described above with respect to FIG. 1A.

The example data querying system 108 includes at least a query writing service 110, a search service 112, and a replicated table data layer 114. In various implementations, the various components of the data querying system 108 may be implemented in more or fewer blocks than those shown in the example illustration of FIG. 1B. Further, in various implementations the functionality of the data querying system 108 may be comprised in multiple separate computing systems, e.g., as part of a hosted computing environment. The replicated table data layer 114 may be comprised in one or more databases and/or data stores. Further, the replicated table data layer 114 may include one or more replicated data tables generated based on the data table, and/or one or more additional tables of data as described herein. The various components of the data querying system 108 are in data communications with one another as illustrated.

In various implementations, the data querying system 108 may further store permissions information (e.g., in one or more databases), and/or may obtain permissions information from other sources (e.g., from other permissions information sources). Further, in various implementations the data querying system 108 may provide interactive graphical user interfaces as described herein, and/or may provide query responses to other computing systems that then integrate the query responses into interactive graphical user interfaces.

In operation, the data querying system 108 may generate, based on a data table and permissions information, the replicated table data layer 114, including one or more replicated data tables. Input search queries 120 (e.g., as provided by the user device 104, either directly or indirectly, such as via another computer device handling the interactive graphical user interface operations) are received by the data querying system 108 at the query writing service 110. The query writing service 110 generates one or more replicated-data-table queries based on the input search query 120, the replicated table data layer 114, and permissions associated with the user operating the user device 104 from which the input search query 120 is received. The replicated-data-table queries are passed to the search service 112, which search service 112 then executes the replicated-data-table queries on the replicated table data layer 114. Results of the replicated-data-table queries are provided by the search service 112 to the query writing service 110. Optionally, subsequent replicated-data-table queries may be provided to the search service 112, executed, and results returned. The query writing service 110 may then combine and/or aggregate the results, and provide a query response back to the user device 104 (either directly or indirectly, e.g., as via another computer device handling the interactive graphical user interface operations). Further details regarding operation of the data querying system 108 are described in reference to additional figures below.

As described herein, the data querying system 108 may be comprised, in part, of an existing computer data system for querying data tables. For example, an existing computer data system for querying data tables may include the search service 112, and one or more databases storing, e.g., a data table, that may be queried by the search service 112. The data querying system 108 may be built on this existing computer data system, and in particular the search service 112, without modification to the search service 112, to provide improved permissioning functionality. The query writing service 110, for example, may generate replicated-data-table queries that may be executed by the search service 112, using the unmodified search service 112 functionality, on the replicated table data layer 114 (which replicated table data layer 114 may be generated based on the data table and additional permissions information), to enable improved computer functionality for permissioning of data in the data table and querying the data table.

Further details regarding the implementation of data querying system 108 are described below in reference to FIG. 11.

In an implementation the data querying system 108 (or one or more aspects of the data querying system 108) may comprise, or be implemented in, a "virtual computing environment". As used herein, the term "virtual computing environment" should be construed broadly to include, for example, computer readable program instructions executed by one or more processors (e.g., as described below in the example of FIG. 11) to implement one or more aspects of the modules, services, and/or functionality described herein. Further, in this implementation, one or more modules/engines/services/etc. (e.g., query writing service 110, search service 112, replicated table data layer 114, and/or the like) of the data querying system 108 may be understood as comprising one or more rules engines of the virtual computing environment that, in response to inputs received by the virtual computing environment, execute rules and/or other program instructions to modify operation of the virtual computing environment. For example, a request received from user device(s) 104 may be understood as modifying operation of the virtual computing environment to cause the system to generate and/or execute queries associated with the request, gather data associated with the request, generate and/or update one or more interactive graphical user interfaces, and/or communicate data back to the data querying system 108. Such functionality may comprise a modification of the operation of the virtual computing environment in response to inputs and according to various rules. Other functionality implemented by the virtual computing environment (as described throughout this disclosure) may further comprise modifications of the operation of the virtual computing environment. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the data querying system 108 as a virtual computing environment may advantageously enable executing different aspects or modules/services of the system on different computing devices or processors, which may increase the scalability of the system. Implementing one or more aspects of the data querying system 108 as a virtual computing environment may further advantageously enable sandboxing various aspects, data, or modules of the system from one another, which may increase security of the system by preventing, e.g., malicious intrusion into the system from spreading. Implementing one or more aspects of the data querying system 108 as a virtual computing environment may further advantageously enable parallel execution of various aspects or modules of the system, which may increase the scalability of the system. Implementing one or more aspects of the data querying system 108 as a virtual computing environment may further advantageously enable rapid provisioning (or de-provisioning) of computing resources to the system, which may increase scalability of the system by, e.g., expanding computing resources available to the system or duplicating operation of the system on multiple computing resources.

For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

As noted above, permissioning may be associated with resources, users, devices, roles, attributes, and/or combinations of the foregoing and/or the like. For example, permissioning may be associated with resources, including but not limited to data items (e.g., data files, data objects, etc.), data item properties or attributes (generally referred to herein as "data item attributes"), groups of data items, data tables or portions of data tables, databases or portions of databases, computer systems, devices, and/or the like. As further examples, permissions may be associated with users, devices, roles, and/or attributes, including but not limited to individual users, groups of users, user accounts, user devices, use cases, user roles, types of users, user or device attributes, and/or the like.

It may be useful and desirable to apply permissioning to the data such that users (e.g., based on user roles, user attributes, etc.) are only allowed access to specific portions (e.g., particular data items attributes/columns) of the data in the data table. However, enforcing such granular permissioning on a single data table may require, for example, access controls associated with each individual cell of the data table, or the smallest/lowest level of data on which permissions are set. Such an access control scheme may create inefficiencies in the querying of the data table, because permissions associated with each user may need to be determined for each individual cell of the table when the table is queried. Such detailed determinations may be necessary, e.g., under the scenario in which permissions are associated with each individual cell of the table, to ensure that access to the data of the table is sufficiently controlled such that users lacking necessary permissions are not granted access to data they do not have sufficient permissions for (e.g., particular columns of data of the data table).

The data querying system 108 of the present disclosure provides improved computer functionality that enables efficient permissioning and querying of specific portions of a data table, e.g., such that users (e.g., based on user roles, user attributes, etc.) are only allowed access to specific portions (e.g., particular data items/rows, and particular data items attributes/columns) of the data. As mentioned above and as further described herein, the system advantageously provides efficient and improved querying and permissioning of specific portions of a data table, according to various implementations, through replication (e.g., in the replicated table data layer 114) of the data table, or portions of the data table, and does not require permissioning of each individual cell of the data table. Further, as noted above, the data table replication, querying, and permissioning techniques of the present disclosure, according to various implementations, advantageously integrate with a wide variety of data table query or search services (e.g., an existing search service 112) to provide improved functionality, efficiency, and data permissioning.

For purposes of clarity of the present disclosure, in the example implementations described herein, permissioning information used for permissioning of the data generally comprises of two parts: "group access permissions" and "sensitivity permissions". In the context of a data table, the term "group access permissions" is a broad term used herein generally to refer to permissioning associated with rows (e.g., particular data items) of the data table, while the term "sensitivity permissions" is a broad term used herein generally to refer to permissioning associated with columns (e.g., data item attributes) of the data table. For example, in the example of each row of the data table representing information related to specific persons (e.g., data items), "group access permissions" may indicate, for a given user, which rows of the table, or which persons (e.g., data items), the user is allowed to access. Such rows may be determined, for example, based on attribute values of one of the columns of the rows, e.g., group numbers or identifiers associated with the persons. Similarly, "sensitivity permissions" may indicate, for a given user, which columns of the table, or which pieces of information (e.g., data item attributes) about the person, the user is allowed to access. As many of the examples of the present disclosure refer to persons and the associated groups to which they belong, the term "group access permissions" is used to facilitate clarity of the present description. Along the same lines, as data items attributes associated with persons in the examples of the present disclosure generally include pieces of information about the persons, and those pieces of information are generally considered to have differing levels of sensitivity (e.g., basic information, personally identifying information, or personal health information), the term "sensitivity permissions" is also used to facilitate clarity of the present description. However, implementations of the present disclosure are not limited to the examples described herein (e.g., data comprising persons belonging to groups and having associated pieces of information), and are not limited by the "group access permissions" and "sensitivity permissions" terminology. Rather, implementations of the present disclosure are more-or-less agnostic to the type of data being stored, and may be applied to various and diverse types of data. Accordingly, in some implementations, the term "group access permissions" may be replaced by terms such as "row access permissions", and "sensitivity permissions" may be replaced by terms such as "column access permissions". In various implementations, as described herein, combinations of group access permissions and sensitivity permissions (and/or multiple combinations of the foregoing) may be associated with a given user (and/or a given resource, device, role, attribute, and/or combinations of the foregoing and/or the like, as mentioned above).

Advantageously, according to various implementations, and as mentioned above, sensitivity permissions functionality may be added to an existing computer data system by way of an added query writing service 110 and replicated table data layer 114. For example, a typical existing computer data system may already provide data table querying functionality (e.g., by way of an existing data table query or search service), including basic group access permissions functionality (e.g., a given user may only have permissions to access certain rows of data tables or permissions are based on the user's role). Various implementations of the present disclosure may include the addition of the query writing service 110, and conversion of a data table to a replicated table data layer 114, in an existing computer data system to provide improved query efficiency and permissioning functionality (e.g., including sensitivity permissions functionality). Advantageously, according to various implementations, the added query writing service 110 and replicated table data layer 114 may be agnostic to the existing data table querying and group access permissions functionality. Accordingly, the system may advantageously improve the query and permissioning functionality of a wide variety of existing computer data systems, as described herein and according to various implementations.

As mentioned above, group access permissions may indicate the portions of a data table that a user may access, including certain data items/rows of the data table, based on, for example, attribute values of one of the columns of the rows, e.g., group numbers or identifiers associated with persons. Referring again to the example data table 202 of FIG. 2, group access permissions ($G_N$) 228 are indicated by group numbers. Such group access permissions functionality may be enforced by an existing search service (e.g., the search service 112). For example, referring to the example data table 202 of FIG. 2, a first user, based on their association with an example group 1 (as indicated in column 206), may be allowed to access data items corresponding to rows 1-2 (e.g., as indicated by $G_1$ 230) of the example data table 202. A second user, based on their association with an example group 2, may be allowed to access data items corresponding to rows 3-4 (e.g., as indicated by $G_2$ 232) of the example data table 202. A third user, based on their association with an example group 3, may be allowed to access data items corresponding to rows 5-6 (e.g., as indicated by $G_3$ 234) of the example data table 202. The data table may include additional groups, as indicated by $G_N$ 236. While in the example above the group access permissions functionality is based on groups associated with users and data items/persons, such permissioning may be based on other combinations of factors, attributes, the like, and/or combinations of the foregoing and/or other information as described herein.

As also mentioned above, sensitivity permissions may also indicate the portions of a data table that a user may access, which portions may comprise particular data item attributes/columns of the data table, e.g., pieces of information associated with persons, based on sensitivity levels associated with those data item attributes/columns. For example, referring again to the example data table 202 of FIG. 2, column 204 ("Unique ID", comprising unique identifier information 220) may be generally accessible and not associated with a sensitivity level, columns 206, 208, and 210 ("Group", "Status", and "Location", comprising basic information ($D_0$) 222) may be associated with a first sensitivity level (e.g., that may be generally accessible to all users), columns 212 and 214 ("Name" and "Address", comprising personally identifying information ($D_1$) 224) may be associated with a second sensitivity level (e.g., that may be accessible to only users in certain roles/groups), and column 216 ("Medical Visit", comprising personal health information ($D_2$) 226) may be associated with a third sensitivity level (e.g., that may be accessible to only users in certain roles/groups). The data table may include additional columns, as indicated by 218, which may be associated with the same or additional sensitivity levels.

According to various implementations, the sensitivity permissions functionality of the system of the present disclosure may be enabled by the query writing service 110 and the replicated table data layer 114. According to various implementations, portions of the data table associated with different sensitivity permissions may be overlapping and/or hierarchically organized (e.g., based on data sensitivity levels or use cases). For example, again referring to the example data table 202 of FIG. 2, a first user may be allowed to access data item attributes corresponding to column 204 (e.g., access to unique identifier information 220 may be available to all users with any permissions to access the data table), and based on their association with first sensitivity level permissions $P_0$ (e.g., providing access to the first sensitivity level), may further be allowed to access data item attributes corresponding to basic information ($D_0$) 222 (e.g., columns 206, 208, and 210). A second user may be allowed to access data item attributes corresponding to column 204, and based on their association with second sensitivity level permissions $P_1$ (e.g., providing access to the first and second sensitivity levels), may further be allowed to access data item attributes corresponding to basic information ($D_0$) 222 and personally identifying information ($D_1$) 224 (e.g., columns 206, 208, 210, 212, and 214). A third user may be allowed to access data item attributes corresponding to column 204, and based on their association with third sensitivity level permissions $P_2$ (e.g., providing access to the first, second, and third sensitivity levels), may further be allowed to access data item attributes corresponding to basic information ($D_0$) 222, personally identifying information ($D_1$) 224, and personal health information ($D_2$) 226 (e.g., columns 206, 208, 210, 212, 214, and 216).

In various cases, the users may be associated with particular sensitivity level permissions (e.g., $P_0$, $P_1$, $P_2$, and/or additional sensitivity level permissions) based on, e.g., their role, device, account, attributes, the like, and/or combinations of the foregoing and/or other information as described herein. Similarly, while in the example above the access to data item attributes (e.g., $D_0$, $D_1$, $D_2$, and/or additional groups of data item attributes/columns) of each subsequent sensitivity level includes all the data item attributes of the pervious sensitivity level (e.g., the permissioning is based on a hierarchical set of permissions), in other implementations and examples different portions or combinations of data item attributes (e.g., including portions that may include non-contiguous groups of columns) may be accessible at different sensitivity levels permissions. Further, as described herein, sensitivity permissions may be combined with group access permissions (e.g., providing access to one or more of groups $G_1$, $G_2$, $G_3$, . . . $G_N$) such that, for example, while a user may have access to a third sensitivity level $P_2$, their access nevertheless may be separately limited to data associated with, e.g., a particular group $G_N$.

V. Example Operation, Methods, and Functionality of the Data Querying System

The system of the present disclosure accomplishes the above-described example permissioning of specific portions of a data table, based on both group access permissions and sensitivity permissions, and using the query writing service 110, search service 112, and replicated table data layer 114, according to various implementations as further described below.

Figure 2:
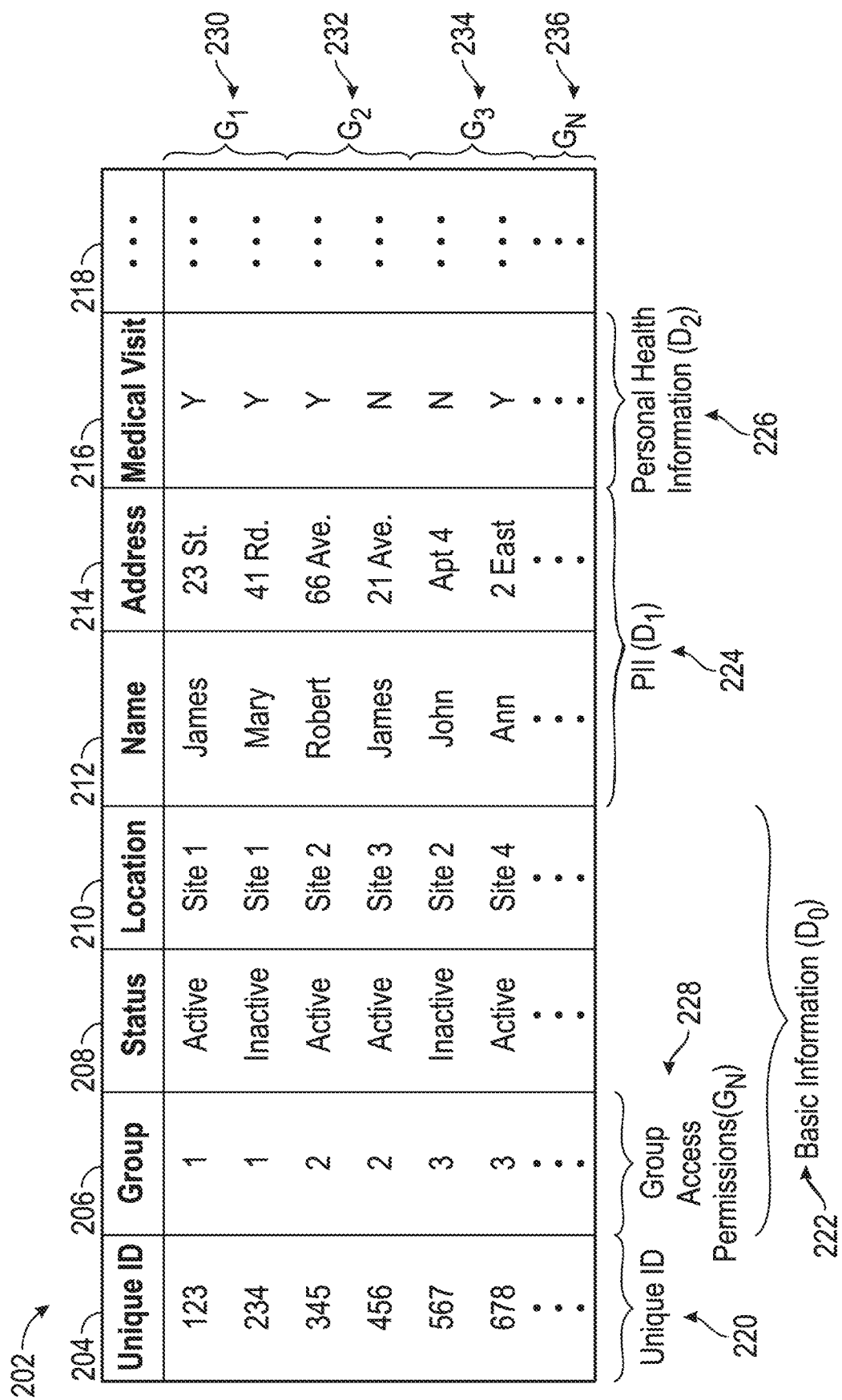
FIG. 2 illustrates an example data table, according to various implementations of the present disclosure.
Figure 3A:
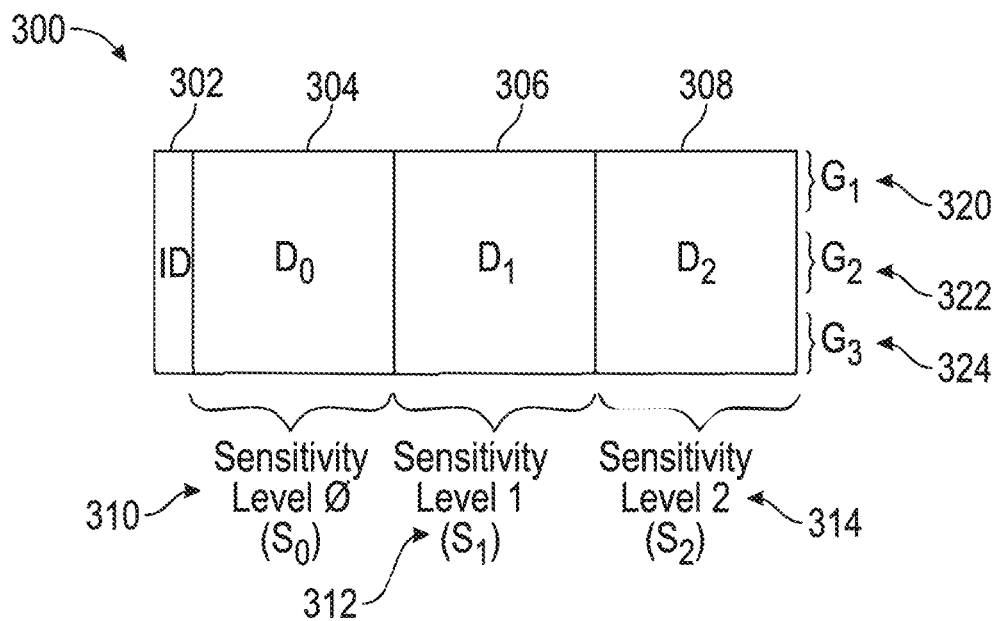
FIG. 3A illustrates an example data table structure, according to various implementations of the present disclosure.

FIG. 3A illustrates an example generalized data table structure 300, for purposes of setting forth terminology to clarify the explanation of the implementations of the present disclosure. Similarities can be drawn between the example data table 202 of FIG. 2A, and the generalized data table structure 300 of FIG. 3A. For example, both data table 202 and the example data table 300 include an ID column, and three additional sets of columns $D_0$, $D_1$, and $D_2$. Such a structure is provided for example and illustrations purposes; the system of the present disclosure may similarly be applied to data tables of different structures, with more or fewer columns, more or fewer groups and/or rows, different permissioning, etc. As shown, the example data table structure 300 comprises a plurality of sets of columns: 302, 304, 306, and 308. Each of the sets of columns may comprise one or more columns of data. The sets of columns represent sets of data item attributes, respectively ID (e.g., unique identifiers), $D_0$, $D_1$, and $D_2$. The sets of columns/attributes, except for the ID column 302, correspond to different sensitivity levels, respectively $S_0$ (sensitivity level 0, 310), $S_1$ (sensitivity level 1, 312), and $S_2$ (sensitivity level 2, 314). Sensitivity level permissions $P_0$, $P_1$, and $P_2$ (not shown in FIG. 3A, but further described below in reference to FIG. 3B), respectively, may be associated with each of the sensitivity levels. Further, the rows of data correspond to different groups (and thereby group access permissions), including $G_1$ (as indicated by 320), $G_2$ (as indicated by 322), $G_3$ (as indicated by 324), and/or additional groups. The implementations of the present disclosure are not limited to the particular generalized data table structure 300, but the generalized data table structure 300 is provided for example and clarification purposes. For example, as described above, the system of the present disclosure may be applied to data tables having more or fewer columns, rows, sets of data attributes, sensitivity levels, sensitivity level permissions, groups, and/or the like.

a. Example Individual Replicated Data Tables

In a first example implementation, the data table to be queried/accessed is replicated into multiple (or one or more) replicated data tables, wherein each of the replicated data tables corresponds to a different sensitivity level. The replicated data tables may together comprise the replicated table data layer 114. The term "replicated table data layer" is a broad term used herein generally to refer to data and information generated by the system based on, and/or in place of, the data table. Advantageously, the replicated table data layer 114, in the present example implementation comprising multiple replicated data tables, provides a data organization or structure that, in part, may enable efficient permissioning (including sensitivity permissions functionality) and querying functionality. As described herein, in various implementations the replicated table data layer (including the associated replicated data tables) may be generated by the data querying system 108, based on an existing data table, prior to, or alternatively in response to, receipt of an input search query. The replicated table data layer may be generated based on the data table, the group access permissions and sensitivity permissions, and other factors, as described herein.

Figure 3B:
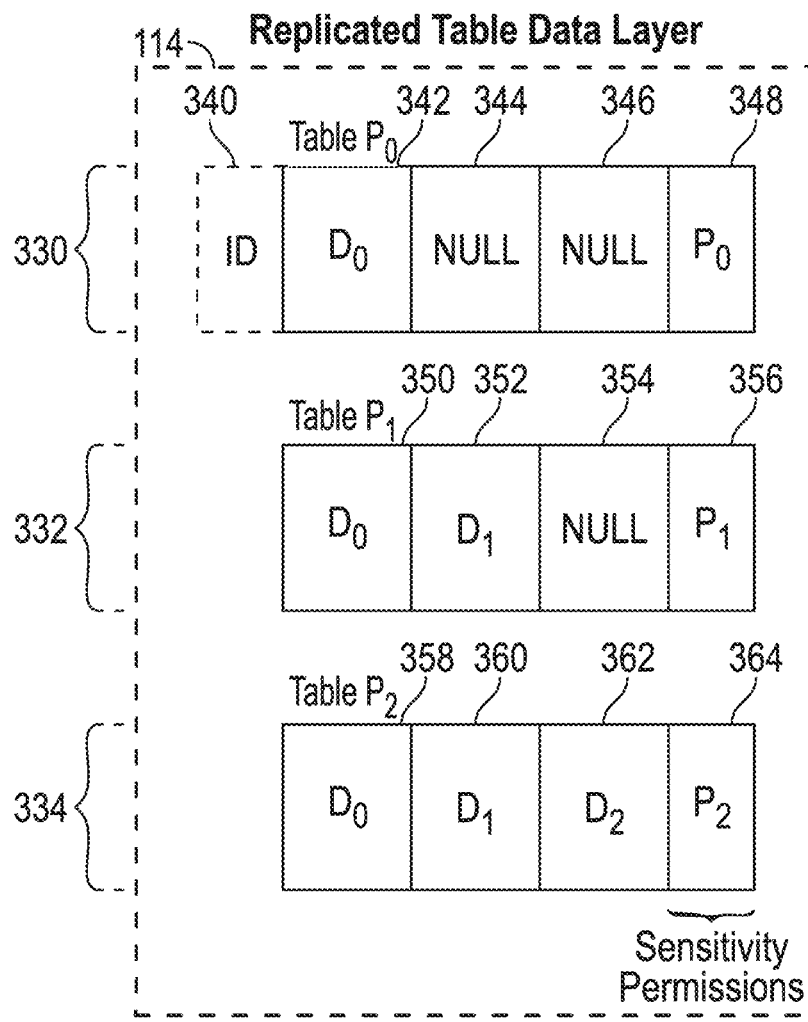
FIG. 3B illustrates an example replicated table data layer, according to various implementations of the present disclosure.

FIG. 3B illustrates an example replicated table data layer 114, according to the present example implementation. The example replicated table data layer 114 of FIG. 3B is based on the example generalized data table structure 300 of FIG. 3A. In particular, the example replicated table data layer 114 of FIG. 3B is based on an example data table comprising an ID (e.g., unique identifier) column, three sets of columns $D_0$, $D_1$, and $D_2$, three associated sensitivity levels $S_0$, $S_1$, and $S_2$, and three associated sensitivity level permissions $P_0$, $P_1$, and $P_2$. This example is given for illustration purposes. Similar principles would apply to generating a replicated table data layer 114 for other data table structures with, e.g., different numbers of sets of columns or sensitivity levels. In an implementation, the replicated table data layer 114 is generated by the data querying system 108. In other implementations, the replicated table data layer 114 may be generated by other aspects or components. As described below, the replicated table data layer 114 is generated based on a structure or schema of the data table, and includes replication of the data table.

As shown, the replicated table data layer 114 of the example of FIG. 3B includes three replicated data tables 330, 332, and 334, one corresponding to each of the sensitivity levels $S_0$, $S_1$, and $S_2$. Because replicated data table 330 corresponds to sensitivity level $S_0$, it is associated with sensitivity level permission $P_0$, and it is therefore referred to as table $P_0$. Similarly, because replicated data tables 332 and 334 correspond to sensitivity levels $S_1$ and $S_2$, respectively, they are respectively associated with sensitivity level permissions $P_1$ and $P_2$, and are therefore referred to as tables $P_1$ and $P_2$, respectively.

In the present example implementation, each of the replicated data tables maintains a schema that overlaps or extends that of the data table. For example, each of replicated data tables $P_0$, $P_1$, and $P_2$ may include most or all the same rows (e.g., a same or similar number of rows, or the same rows plus additional rows), and optionally the corresponding data, and most or all the same columns (e.g., a same or similar number of columns, or the same columns plus additional columns), and optionally corresponding column names/types/etc., as the data table upon which the replicated table data layer 114 is based. In some cases, the replicated data tables may differ from the data table in some respects, for example the rows or columns may be ordered differently, additional rows or columns may be added, or some rows or columns may not be included (e.g., only replicated data table 330 includes the ID column), however generally each of the replicated data tables have schemas that more-or-less overlap or extend the structure of the data table. Note, in all of the examples of the present disclosure, not all columns or other data of the data tables (e.g., primary key columns) may be shown in the interest of clarity and conciseness. However, implementations including such columns and data are contemplated within the scope of this disclosure.

While each of the replicated data tables has a schema that overlaps or extends that of the data table, in the present example implementation, certain data of the replicated data tables is modified based on the respective different sensitivity levels (e.g., sensitivity levels $S_0$, $S_1$, and $S_2$) associated with each of the replicated data tables. In particular, any data contained in a replicated data table that does not satisfy the sensitivity level associated with the replicated data table is removed, and optionally replaced with NULL values (or other equivalent indications that no data is present).

Accordingly, in the case in which the data table includes data with three sensitivity levels $S_0$, $S_1$, and $S_2$, and the sensitivity levels are hierarchical such that each subsequent higher sensitivity level includes all sensitivity levels below it, the replicated table data layer 114 may include three replicated data tables (as illustrated in FIG. 3B): a first replicated data table $P_0$ corresponding to a first sensitivity level $S_0$ and including only data accessible at first sensitivity level permissions $P_0$; a second replicated data table $P_1$ corresponding to a second sensitivity level $S_1$ and including only data accessible at first and second sensitivity level permissions $P_0$ and $P_1$; and a third replicated data table $P_2$ corresponding to a third sensitivity level $S_2$ and including data accessible at first, second, and third sensitivity level permissions $P_0$, $P_1$, and $P_2$ (which may generally include all the data of the data table; e.g., the third replicated data table may be a copy of the data portions of the data table, with optional extended or excluded data, as described below).

In general, as described in the examples of the present disclosure, sensitivity levels are hierarchical such that each subsequent higher sensitivity level includes all sensitivity levels below it. However, the sensitivity levels need not be hierarchical, and thus in various implementations the replicated data tables may not be generated to have the general hierarchical structure described in the present examples, but rather based on the structure of the related sensitivity levels.

Thus, referring again to example replicated table data layer 114 of FIG. 3B, table $P_0$, which corresponds to sensitivity level $S_0$ and is associated with sensitivity level permission $P_0$, includes the set of columns $D_0$ (342) as from the data table, e.g., with all data item attributes included in those columns. However, while table $P_0$ also includes the sets of columns $D_1$ (344) and $D_2$ (346) from the data table, the data item attribute information included in those sets of columns is set to NULL values (or other equivalent indications that no data is present). This is because table $P_0$, while it is replicated from the data table, is updated such that it only includes data that should be accessible to a user having sensitivity level permission $P_0$, e.g., data associated with sensitivity level $S_0$. Thus, data having higher sensitivity levels is set to NULL values in table $P_0$. Similarly, tables $P_1$ and $P_2$ are updated so that they only have data that should be accessible to a user having sensitivity level permissions associated with those tables. Thus, in table $P_1$ data in the sets of columns $D_0$ (350) and $D_1$ (352) are included, but the set of columns $D_2$ (354) are set to NULL, while in table $P_2$ all sets of columns (358, 360, and 362) are included (e.g., a user having sensitivity level permissions $P_2$ is authorized to access data item attributes at sensitivity levels 0, 1, and 2, given the hierarchical organization of the sensitivity permissions assumed in the present example).

As shown in FIG. 3B, in the replicated table data layer 114, the structure or schema of the replicated data tables may not be identical to that of the data table. Rather, the structure or schema of the replicated data tables may overlap or extend that of the data table. For example, as shown in FIG. 3B, in the example implementation only the replicated data table 330 associated with the lowest sensitivity level permissions $P_0$ includes that unique ID column 340. In another example, as shown in FIG. 3B, each of the replicated data tables 330, 332, and 334 includes an additional column of data (348, 356, and 364, respectively) which specifies the sensitivity level permissions associated with each of the rows of those replicated data tables. Thus, as shown in FIG. 3B, replicated data table 330 includes column 348 which specifies, for each of the rows of the replicated data table 330, that sensitivity level permission $P_0$ is associated with the data of those rows; replicated data table 332 includes column 356 which specifies, for each of the rows of the replicated data table 332, that sensitivity level permission $P_1$ is associated with the data of those rows; and replicated data table 334 includes column 364 which specifies, for each of the rows of the replicated data table 334, that sensitivity level permission $P_2$ is associated with the data of those rows.

In alternative implementations, the unique ID column may be included in each of the replicated data tables of the replicated table data layer, or it may be included in a separate table of the replicated table data layer. In alternative implementations, the sensitivity permissions columns may not be included in the replicated data tables.

Figures 4, 5:
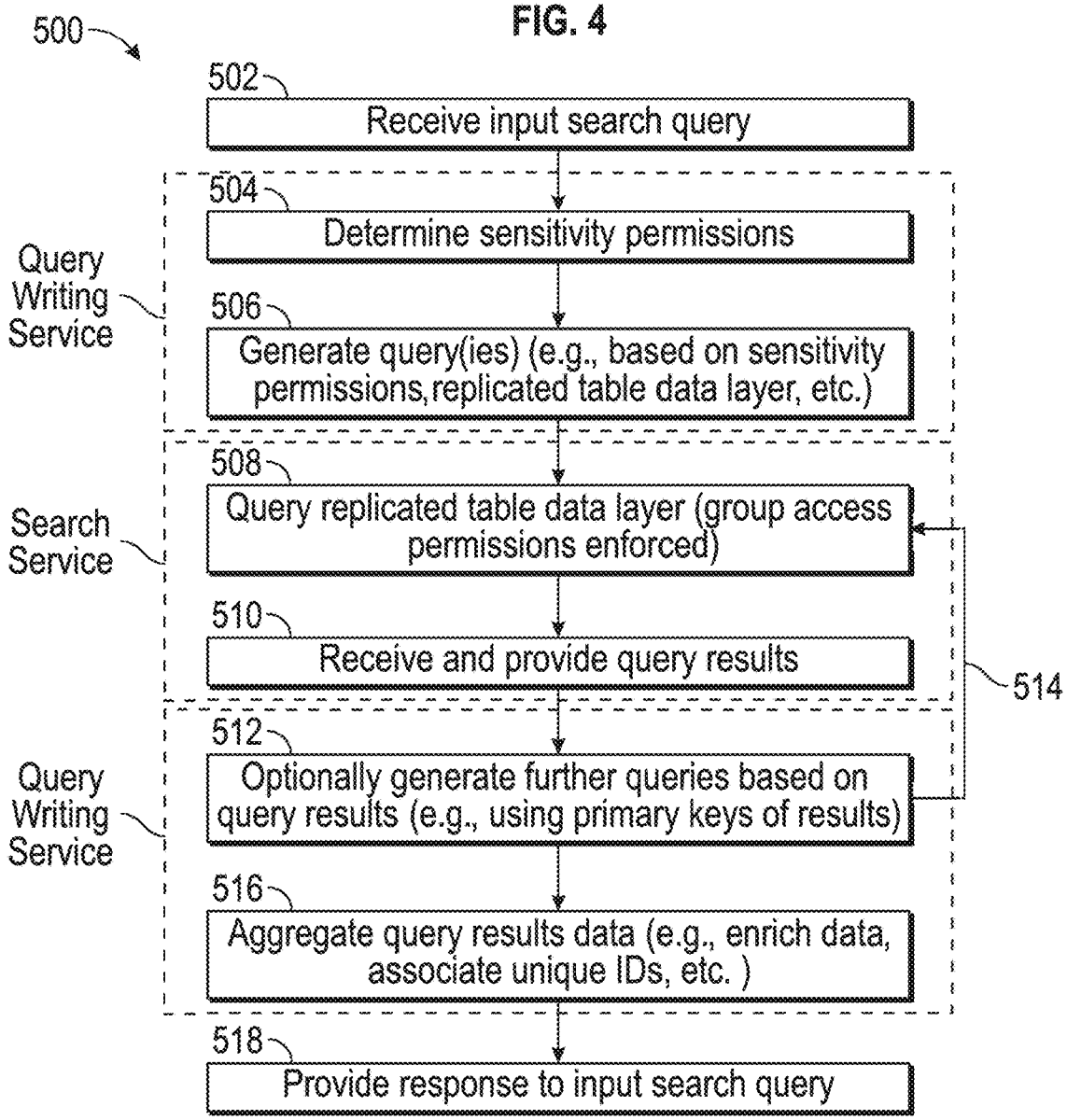
FIG. 4 illustrates example permissions, according to various implementations of the present disclosure.
FIG. 5 is a flowchart illustrating an example method and functionality, according to various implementations of the present disclosure.

FIG. 4 illustrates example permissions, according to various implementations of the present disclosure. The permissions of FIG. 4 are provided as an example and for illustrative purposes, and in various implementations permissions may be structured differently than in the example shown. The example permissions of FIG. 4 assume, as described above, that users are associated with group access permissions and sensitivity permissions. Further, the example permissions of FIG. 4 assume, as described above, that the sensitivity permissions are structured hierarchically, such that each higher level of sensitivity permissions includes all permissions of the levels below. In other implementations, the sensitivity permissions may not be structured hierarchically. As shown in the permissions table of FIG. 4, each user of the system (listed in column 402), is associated with group access permissions (listed in column 404) and sensitivity permissions (listed in column 406). Further, as indicated in column 408, each of the users of the users of the system has default sensitivity level permissions $P_0$. Accordingly, in the permissions scheme of the example of FIG. 4, any user of the system is permitted to access the lowest sensitivity level information associated with all groups. However, for higher sensitivity level data, the users must have specific permissions for those groups and sensitivity levels. Thus, for example, while user 1 only has sensitivity level permissions $P_0$ for all groups, user 2 additionally has sensitivity level permissions $P_1$ for group $G_1$. In other words, in the context of the example generalized data table structure 300 of FIG. 3A, user 2 is permitted to access data $D_0$ (which is associated with sensitivity level $S_0$) for all groups, and additionally access data $D_1$ (which is associated with sensitivity level $S_1$) for group $G_1$. Similarly, for example, user 3 has sensitivity level permissions $P_1$ for group $G_2$, user 4 has sensitivity level permissions $P_1$ for groups $G_1$ and $G_2$, and user 5 has sensitivity level permissions $P_2$ for group $G_3$. Accordingly, in the context of the example generalized data table structure 300 of FIG. 3A, user 5 is permitted to access data $D_0$ (which is associated with sensitivity level $S_0$) for all groups, and additionally access data $D_1$ and $D_2$ (which are associated with sensitivity levels $S_1$ and $S_2$) for group $G_3$.

FIG. 5 is a flowchart 500 illustrating an example method and functionality of the system, according to various implementations of the present disclosure, including at least the present example implementation. Below, operation of the system, according to the present example implementation, will be generally described in reference to the flowchart 500 of FIG. 5, and for clarity specific examples will be provided based on the example permissions of FIG. 4 (described above) and the example replicated table data layer 114 of FIG. 3B (described above). In various implementations, and as described below, various blocks of the methods described below may be optional, and/or the blocks may occur in different orders.

Referring to flowchart 500 of FIG. 5, in the present example implementation, the system includes the query writing service 110 that, at block 502, receives an input search query 120 associated with the data table from a user (or device, and/or the like). At block 504, the query writing service 110 determines sensitivity level permissions associated with the input search query (e.g., based on information requested in the query, the user, the user's role, a device, an account, one or more attributes, metadata associated with data of the system, the like, and/or combinations of the foregoing and/or other information as described herein), and, at block 506, generates one or more new queries (generally referred to herein as a "replicated-data-table query" or "replicated-data-table queries") based on the determined sensitivity permissions. The replicated-data-table query (or queries) includes at least an identification of the particular replicated data table (e.g., one or more of replicated data tables 330, 332, and 334) associated with the determined sensitivity level permissions. For example, if the input search query 120 requests information found in data $D_1$, which data is associated with sensitivity level $S_1$, the query writing service 110 may generate a replicated-data-table query that refers to replicated data table 332, e.g., table $P_1$ associated with sensitivity level permission $P_1$. Advantageously, at block 504 the query writing service 110 may generate multiple replicated-data-table queries referring to multiple replicated data tables as necessary to obtain the necessary data from the replicated table data layer to respond to the input search query 120. These multiple queries may be executed sequentially or serially, and/or simultaneously (e.g., in parallel) on the replicated table data layer. Examples of multiple replicated-data-table queries are described in further detail below in reference to optional block 512 and arrow 514, but in various implementations the query writing service 110 may advantageously generate the further/multiple replicated-data-table queries in advance (e.g., in block 506) of any initial query of the replicated table data layer being executed.

Alternatively, or in addition, the system may determine sensitivity permissions associated with the requesting user, and may confirm whether the requesting user has a sufficient sensitivity level permission to access the data to be queried. If not, no replicated-data-table query may be generated.

At block 508, the replicated-data-table query is then passed to the search service 112, which search service 112 then executes that query on the replicated table data layer. At block 510, results of the replicated-data-table query are received by the search service 112, and passed back to the query writing service 110. At block 512, depending on the type of input search query, and the determined sensitivity level permissions, the query writing service may then generate and initiate (e.g., as indicated by arrow 514 looping back to blocks 508 and 510) one or more additional replicated-data-table queries identifying other replicated data tables of the replicated table data layer, and further identifying rows corresponding to results of the previous replicated-data-table queries (e.g., user primary keys associated with rows returned in the previous query results, as further described in reference to the examples below). For example, in an instance where the input search query 120 refers to data of higher sensitivity levels, or where the user is associated with sensitivity level permissions higher than those associated with the query, multiple replicated-data-table queries may be generated by the query writing service 110 to cause query of replicated data table corresponding to those associated replicated data tables, such that all data associated with the query and/or the user's sensitivity level permissions may be obtained by the search service 112. As noted above, in various implementations such additional/multiple replicated-data-table queries may alternatively be generated in advance (e.g., in block 506) of any initial query of the replicated table data layer being executed. In such an implementation, multiple queries of one or more replicated data tables of the replicated table data layer may be executed sequentially or serially, and/or simultaneously (e.g., in parallel). Examples of such further replicated-data-table queries are described below in reference to FIGS. 6B and 6C.

At block 516, the query writing service 110 then combines or aggregates the results of all the replicated-data-table queries, restores unique identifiers associated with each of the rows of the combined/aggregated results if needed, and at block 518 provides a response to the input search query 120. In particular, unique IDs associated with rows of the data table are obtained and added to the query result, e.g., from replicated data table 330 or another table of the replicated table data layer, such that the provided response to the input search query 120 is structured as if the original data table itself was directly queried.

In the present example implementation, as described above, any applicable group access permissions are enforced by the search service 112 as they would be if the data table were being queried directly. Thus, for example, when the search service 112 executes a replicated-data-table query on a replicated data table, existing group access permissioning provided by the search service 112 is still in effect such that the querying user is only permitted access to rows of the table corresponding to groups for which the user has access. Accordingly, the query writing service 110 enables sensitivity permissioning by way of the replicated table data layer 114 and generation of replicated-data-table queries, and the search service 112 provides existing group access permissioning. As noted above, each cell of the various data tables need not be permissioned separately.

Thus, advantageously, according to various implementations, due to the functionality of the query writing service 110, a user of the system may not be aware that there is anything other than the data table being queried. In other words, the query writing service 110 may, invisibly from the perspective of the user, handle translating input search queries to function with the replicated table data layer 114 (e.g., by way of the search service 112), and then translating results from queries of the table data layer back to what would be expected of a user who believes they are only querying the data table directly. Further, as described above, the combination of the functionality of the query writing service 110 and the replicated table data layer 114 enables the system to function with an existing search service 112. In combination, the various aspects of the system, according to various implementations, provides efficient and improved querying and permissioning (including group access permissions and sensitivity permissions) of specific portions of a data table.

FIGS. 6A-6C illustrate example operation of the system, according to various implementations of the present disclosure, including at least the present example implementation.

Referring to FIG. 6A, an example input search query 602 is provided: "Return Personnel that have had a Medical Visit". As described above in reference to the example data table 202 of FIG. 2, medical visit information ($D_2$) is associated with sensitivity level $S_2$ (and thus a user requires sensitivity level permissions $P_2$ to access it). The replicated data table corresponding to sensitivity level permissions $P_2$ is table $P_2$ (e.g., replicated table data layer 114 of FIG. 3B), and thus the query writing service 110 generates a replicated-data-table query 604 that references table $P_2$: "Query Table $P_2$ for Personnel where Medical Visit=Y". The replicated-data-table query is then provided to the search service 112, and executed by the search service 112 on the replicated table data layer 114, causing a query of table $P_2$, while the search service 112 enforces the group access permissions already provided by the search service 112. A response is returned by the search service 112 to the query writing service 110. The query writing service 110 ensures that the response is combined and/or aggregated to include, e.g., the unique IDs associated with rows returned in the response, and the final response to the input search query 120 is provided by the query writing service 110. Example final query responses 606 are shown in FIG. 6A for different users, based on the example permissions shown in FIG. 4. In particular, no results are provided for any of users 1-4, as none of those users has sensitivity level permission $P_2$, and thus a query of table $P_2$ for those users would return no results. However, because user 5 does have sensitivity level permission $P_2$ for group $G_3$, when the search service 112 queries table $P_2$ for user 5, rows of the replicated data table associated with group $G_3$ are accessible. In particular, rows associated with unique IDs 567 and 678 are accessible, and as the row associated with unique ID 678 satisfies the Medical Visit=Y query condition, the query result provided to user 5 includes that row of data from table $P_2$, with the added ID column.

Referring to FIG. 6B, an example input search query 610 is provided: "Return Personnel that have Name James or John". As described above in reference to the example data table 202 of FIG. 2, name information ($D_1$) is associated with sensitivity level $S_1$, and thus a user requires sensitivity level permissions $P_1$ to access it. The replicated data table corresponding to sensitivity level permissions $P_1$ is table $P_1$ (e.g., replicated table data layer 114 of FIG. 3B), and thus the query writing service 110 generates a replicated-data-table query 612 that references table $P_1$: "Query Table $P_1$ for Personnel where Name=James or John". The replicated-data-table query is then provided to the search service 112, and executed by the search service 112 on the replicated table data layer 114, causing a query of table $P_1$, while the search service 112 enforces the group access permissions already provided by the search service 112. A response is returned by the search service 112 to the query writing service 110. The query writing service 110 ensures that the response is combined and/or aggregated to include, e.g., the unique IDs associated with rows returned in the response, and the final response to the input search query 120 is provided by the query writing service 110. Example final query responses 616 are shown in FIG. 6B for different users, based on the example permissions shown in FIG. 4. In particular, no results are provided for user 1, as user 1 lacks sensitivity level permission $P_1$, and thus a query of table $P_1$ for user 1 would return no results. However, because users 2-4 do have sensitivity level permission $P_1$ for various individuals or combinations of groups $G_1$ and $G_2$, when the search service 112 queries table $P_1$ for users 2-4, rows of the replicated data table associated with certain of groups $G_1$ and $G_2$ are accessible. Thus, as shown in the example final query responses 616, query responses for users 2-4 include rows of data satisfying the query conditions, and which are accessible to the respective users based on the group access permissions. As indicated, as the replicated-data-table query references replicated data table $P_1$, and columns $D_2$ have been removed and replaced with NULL values in that replicated data table, the results provided to users 2-4 include NULL values in the medical visit column. Thus, users 2-4 are not permitted to access data of sensitivity levels higher than those user's corresponding sensitivity level permissions.

Regarding user 5, user 5 has sensitivity level permissions that are higher than $P_1$, specifically sensitivity level permission $P_2$ for group $G_3$. In one example implementation, the system proceeds similarly for user 5 as for users 2-4 described above, and returns results 618 for group $G_3$ for which the user has sensitivity level and group access permissions. In an alternative example implementation, the system may then proceed with further one or more replicated-data-table queries to enrich the data provided by the initial replicated-data-table query to provide user 5 with all the information for which user 5 has sensitivity level permissions. In particular, at block 512 of flowchart 500 of FIG. 5, the query writing service 110 generates one or more additional replicated-data-table queries to obtain additional data from other replicated data tables to fill in NULL values present in the initial replicated-data-table query response. Specifically, referring again to FIG. 6B, the query writing service 110 generates a further replicated-data-table query 614 to obtain data associated with the higher sensitivity level permission $P_2$ with which user 5 is associated: "Query Table $P_2$, in Set of Initial Response, where Name=James or John". Here, the further replicated-data-table query is further limited from the initial replicated-data-table query so as to only reference rows corresponding to rows returned in the initial replicated-data-table query response, e.g., the "in Set of Initial Responses" portion of the further replicated-data-table query. The rows may be referenced by primary keys, or other means. As replicated data table $P_2$ has the same rows as replicated data table $P_1$, the relevant rows can be identified through any number of efficient means. Advantageously, the more specific limited query may provide more efficient querying in the further replicated-data-table query, and may provide more efficient delivery of query results of a smaller size, thereby potentially saving bandwidth or processing needs. In some implementations, the further condition on the query ("where Name=James or John") may not be included because the relevant rows of the replicated data tables may already be identified. However, exclusion or inclusion of the additional condition may provide more efficient querying, in various instances. When the result of the further replicated-data-table query 614 is received by the query writing service 110 from the search service 112, the query writing service 110 aggregates, combines, and/or enriches the results of all the queries, e.g., such that the combined response includes the Medical Visit=N information in the last column 620 of the response. As noted above in reference to FIG. 5, in various implementations the further replicated-data-table query may alternatively be generated along with the initial generated replicated-data-table query, and may be executed sequentially or serially, and/or simultaneously (e.g., in parallel), with the initial replicated-data-table query. In such an implementation, the query writing service 110 may provide the information necessary to further limit the further replicated-data-table query as described above, or alternatively the further replicated-data-table query may not be further limited.

Referring to FIG. 6C, an example input search query 630 is provided: "Return Personnel that are Active". As described above in reference to the example data table 202 of FIG. 2, status information ($D_0$) is associated with sensitivity level $S_0$ (and thus a user requires sensitivity level permissions $P_0$ to access it). The replicated data table corresponding to sensitivity level permission $P_0$ is table $P_0$ (e.g., replicated table data layer 114 of FIG. 3B), and thus the query writing service 110 generates a replicated-data-table query 632 that references table $P_0$: "Query Table $P_0$ for Personnel where Status=Active". The replicated-data-table query is then provided to the search service 112, and executed by the search service 112 on the replicated table data layer 114, causing a query of table $P_0$, while the search service 112 enforces the group access permissions already provided by the search service 112. A response is returned by the search service 112 to the query writing service 110. The query writing service 110 ensures that the response is combined and/or aggregated to include, e.g., the unique IDs associated with rows returned in the response, and the final response to the input search query 120 is provided by the query writing service 110. Example final query responses 636 are shown in FIG. 6C for different users, based on the example permissions shown in FIG. 4. Note that, because all users are granted sensitivity level permissions $P_0$ for all groups, for all users 1-5 responses are provided that include the basic information $D_0$ for all personnel that are active status. Thus, in an example implementation, the final responses for all users provided by the query writing service 110 is the same and matches that provided for user 1 (which only has sensitivity level permissions $P_0$), as indicated at 638 and 642. In these responses, all data for columns $D_1$ and $D_2$ (corresponding to sensitivity levels $D_1$ and $D_2$) are NULL, as the replicated-data-table query references replicated data table $P_0$ in replicated table data layer 114 of FIG. 3B.

In an alternative example implementation, because certain users have sensitivity level permissions higher than $P_0$, further one or more replicated-data-table queries to enrich the data provided by the initial replicated-data-table query may be generated and executed, and the results combined with the initial replicated-data-table query results, in a manner analogous to that described above for user 5 in reference to FIG. 6B. For example, in the example of FIG. 6C, as users 2-5 all have sensitivity level permissions higher than $P_0$, at least for some groups, for those users additional replicated-data-table queries may be generated by the query writing service 110 to cause query of additional replicated data tables of the replicated table data layer 114, depending on the specific sensitivity level permissions of each user. For user 2, a further replicated-data-table query is generated and executed to obtain additional $D_1$ column data for group $G_1$ personnel, and thus row 640 includes additional $D_1$ column data in FIG. 6C. For user 5, one or more further replicated-data-table queries are generated and executed to obtain additional $D_2$ column data for group $G_3$ personnel, and thus row 644 includes additional $D_1$ and $D_2$ column data in FIG. 6C. This may include, for example a single replicated-data-table query of replicated data table $P_2$, or multiple replicated-data-table queries of replicated data tables $P_1$ and $P_2$. An example of the additional replicated-data-table query/queries 634 that may be generated and executed is shown in FIG. 6C: "Query Table $P_1$ and $P_2$, in Sets of Responses, for Personnel where Status=Active". As described above in reference to the example of FIG. 6B, the one or more further replicated-data-table queries may or may not include multiple conditions, and/or may be limited to particular rows of the replicated data tables (in various ways), and the like. As also noted above in reference to FIGS. 5 and 6B, in various implementations the further replicated-data-table query may alternatively be generated along with the initial generated replicated-data-table query, and may be executed sequentially or serially, and/or simultaneously (e.g., in parallel), with the initial replicated-data-table query.

Figure 7A:
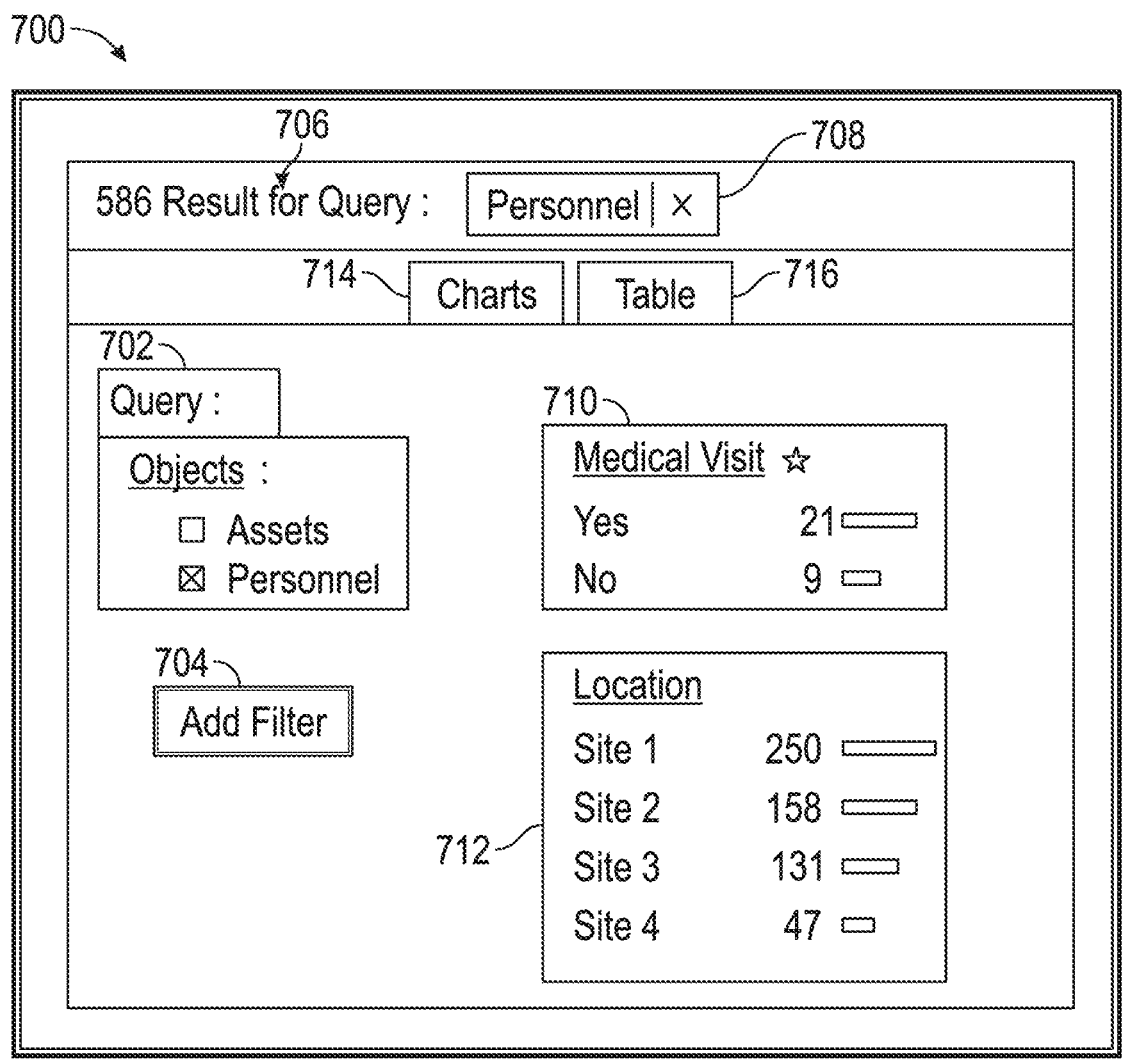
FIGS. 7A-7C illustrate example interactive graphical user interfaces, according to various implementations of the present disclosure.
Figure 7B:
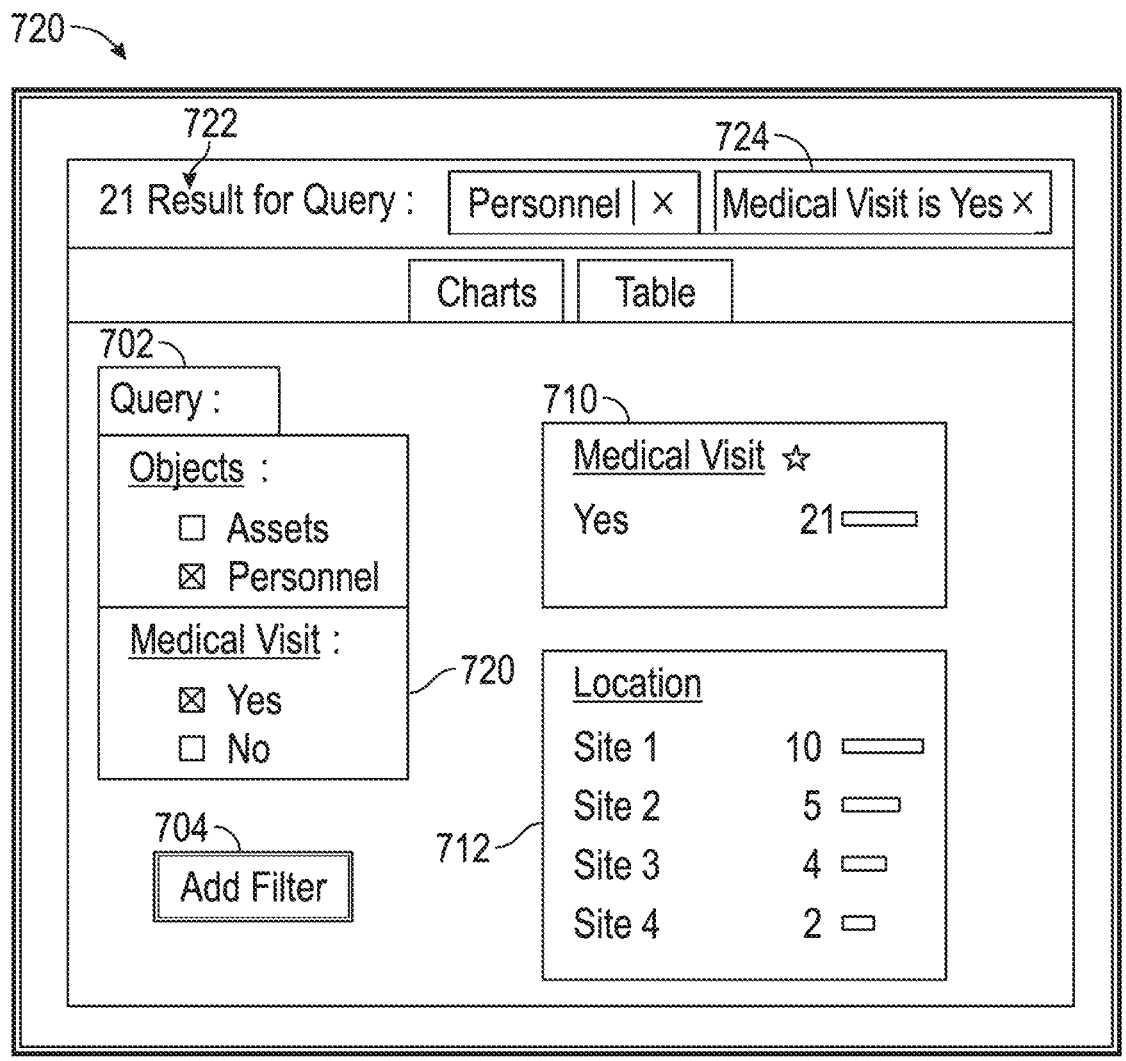
Figure 7C:
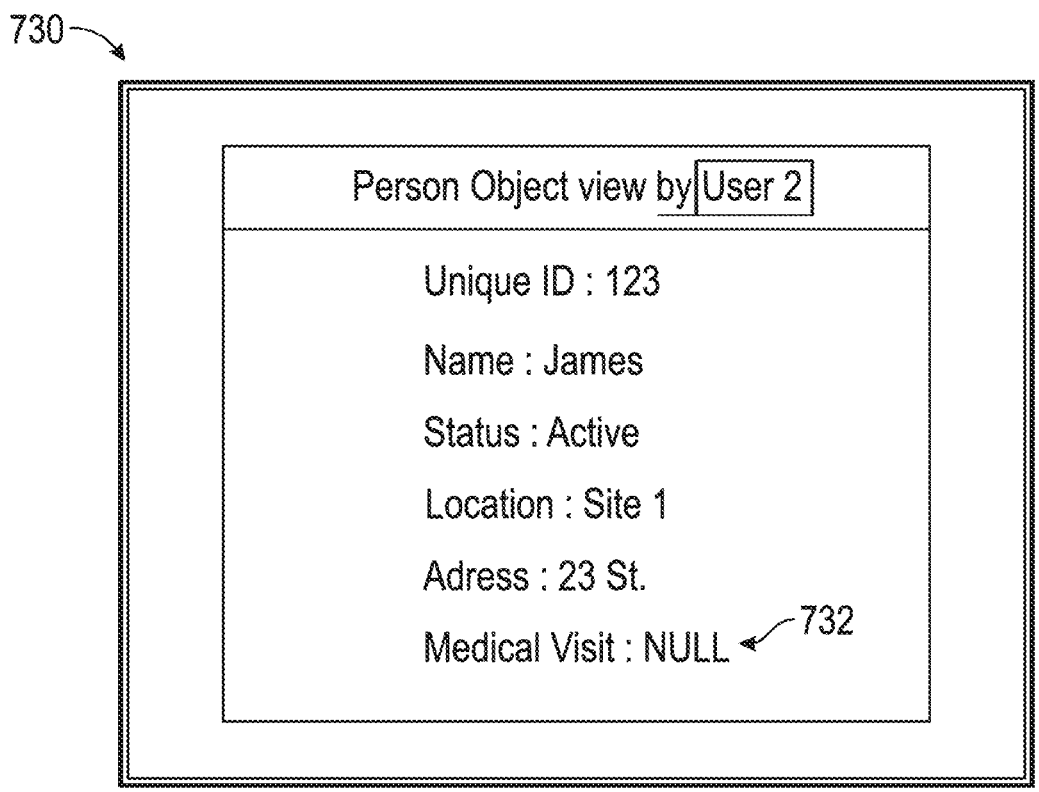

FIGS. 7A-7C illustrate example interactive graphical user interfaces, according to various implementations of the present disclosure, that may be displayed on a user device 104, and by which a user may interact with the system of the present disclosure (although, as described above, the present disclosure is not limited to interactions via interactive graphical user interfaces). As users provide inputs to the example interactive graphical user interfaces, such inputs may comprise input search queries 120 that may be provided to the query writing service 110 by the data querying system 108. Responses provided by the query writing service 110 may then, by the data querying system 108, be converted into updates to the interactive graphical user interfaces to provide useful insights to the user.

Referring to FIG. 7A, and example interactive graphical user interface 700 is shown that includes elements for querying and/or filtering personnel information (e.g., information as shown in the example data table 202 of FIG. 2). The user can input a query via a query element 702, specifying what types of objects are of interest: assets and/or personnel (other types of objects may be listed in other implementations in which the data table includes other objects). The user has selected personnel for the query/filter. At element 704, the user can input additional queries/filters, as described in reference to FIG. 7B, below. The results of the query are reflected at element 706, by way of a quantity of objects matching the query. Additionally, the user interface includes an indication 708 of the currently applied filters/queries. In the graphical user interface, elements 710 and 712 include additional quantitative and/or qualitative information regarding the results of the query. Element 710 shows numbers of personnel that have or have not had a medical visit. Element 712 shows numbers of personnel that are at each location. Of note, fewer personnel are represented in the element 710 than in the element 712. Such is the case to illustrate that the current user of the system may not have access to medical visit information (e.g., data columns $D_2$) for all personnel, but rather only for a certain group (or groups) of personnel. Thus, only data that the user has permissions to access are shown in the graphical user interface. Element 710 may include an indication (e.g., the star shown in graphical user interface 700) that the displayed attribute data requires higher permissions, and thus not all personnel may be represented in that element of the graphical user interface. Thus, the example interactive graphical user interface of FIG. 7A may be provided, for example, to the example user 5 of the examples described above, which user has sensitivity level permission $P_2$ for certain groups of personnel, but not all groups. The interactive graphical user interface 700 also includes elements 714 and 716 for accessing different view of the query results. A charts view is currently shown in example user interface 700, and by selection of element 716 the user may access a table view of the query results.

Referring to FIG. 7B, an example interactive graphical user interface 720 is shown that is similar to the user interface 700 of FIG. 7A, but in which the user has applied another filter, or other aspect, to the query by selection of element 704, as indicated in element 702. Specifically, the user has filtered to Medical Visit=Y. The narrower query is reflected in the smaller quantity of results at element 722, and the updated filter list is shown at element 724. Elements 710 and 712 reflect the updated query, and now as expected, the total numbers of personnel represented in elements 710 and 712 match, as the query is limited to only those personnel which the user has access to their Medical Visit attribute information (e.g., the $D_2$ columns associated with sensitivity level $S_2$), e.g., a highest sensitivity level in a hierarchical arrangement of sensitivity levels.

Referring to FIG. 7C, a further interactive graphical user interface 730 is shown which includes a detailed view of a particular personnel record, as viewed by, for example, user 2. As user 2 only has sensitivity level permissions $P_1$ for the group $G_1$, of which the selected person is a part, the person's $D_0$ and $D_1$ attribute data is shown, but the $D_2$ attribute data is NULL.

In various implementations, users may comprise leaders of groups, and/or administrators of various types, and their associated permissions (including group access permissions and sensitivity permissions) may reflect those roles. For example, user 2 may be a leader of group $G_1$, and user 3 may be a leader of group $G_2$. User 4 may have oversight of both groups $G_1$ and $G_2$, and user 5 may have a medical role in group $G_3$.

b. Example Combined Replicated Data Table

In a second example implementation, the rows of the data table to be queried/accessed are replicated multiple (or one or more) times in a single replicated data table, wherein each of the replicated sets of rows corresponds to a different sensitivity level. The replicated data table may comprise the "replicated table data layer", in the present second example implementation. As noted above, the term "replicated table data layer" is a broad term used herein generally to refer to data and information generated by the system based on, and/or in place of, the data table. Advantageously, the "replicated table data layer", in the present example implementation comprising a single replicated data table with multiple replicated sets of rows, provides a data organization or structure that, in part, may enable efficient permissioning (including sensitivity permissions functionality) and querying functionality.

In the present implementation, the functionality of the system is similar to that described above in reference to the first example implementation. For example, the system includes the query writing service 110, the search service 112, and the replicated table data layer 114. However, in the present example implementation, the replicated table data layer 114 is structured differently (e.g., to include a single replicated data table with multiple replicated sets of rows, rather than multiple replicated data tables), and thus there are some differences in the operation of the query writing service 110. However, it should be understood that various aspects of the operation of the system as described above in references to the first example implementation may similarly apply to the present example implementation (e.g., including the operation of the example interactive graphical user interfaces).

Figures 8, 9:
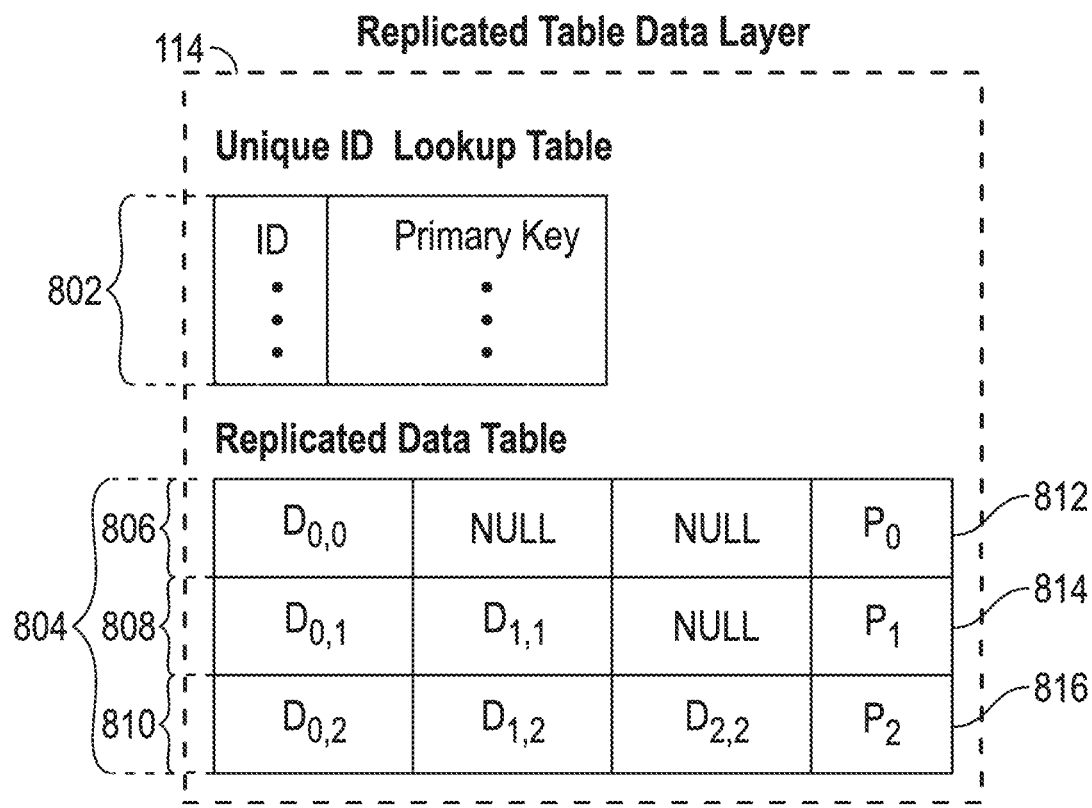
FIG. 8 illustrates another example replicated table data layer, according to various implementations of the present disclosure.
FIG. 9 illustrates additional example permissions, according to various implementations of the present disclosure.

As mentioned above, in the present example implementation, instead of multiple replicated data tables, a single replicated data table contains all the replicated data corresponding to each of the sensitivity levels. Thus, the replicated table data layer is structured differently. FIG. 8 illustrates an example replicated table data layer 114, according to the present example implementation. The example replicated table data layer 114 of FIG. 8 is based on the example generalized data table structure 300 of FIG. 3A. In particular, the example replicated table data layer 114 of FIG. 8 is based on an example data table comprising an ID (e.g., unique identifier) column, three sets of columns $D_0$, $D_1$, and $D_2$, and three associated sensitivity levels $S_0$, $S_1$, and $S_2$. This example is given for illustration purposes. Similar principles would apply to generating a replicated table data layer 114, in this example implementation, for other data table structures with, e.g., different numbers of sets of columns or sensitivity levels.

As shown in FIG. 8, the replicated table data layer 114 includes a single replicated data table 804. The replicated data table 804 includes multiple (e.g., in this example, three) replicated sets of rows: replicated set of rows 806, replicated set of rows 808, and replicated set of rows 810. One replicated set of rows corresponds to each of the sensitivity levels $S_0$, $S_1$, and $S_2$, and thereby the respective sensitivity level permissions $P_0$, $P_1$, and $P_2$, as indicated by elements 812, 814, and 816.

Aside from being in a single replicated data table, each of the replicated sets of rows is generally similar to the corresponding individual replicated data tables of the first example implementation described above. For example, certain columns of data are set to NULL values (or other equivalent indications that no data is present) depending on the sensitivity permissions associated with the particular sets of rows, the single replicated data table has a schema that more-or-less overlaps or extends the structure of the source data table, and the single replicated data table includes an additional column of data which specifies the sensitivity level permissions associated with each of the rows of the single replicated data table.

As shown in FIG. 8, the replicated table data layer 114 may include a separate "Unique ID Lookup Table" that provides a link between the unique identifiers of the source/original data table, and rows of the single replicated data table (e.g., by reference to the primary keys of the single replicated data table). In some implementations, the Unique ID Lookup Table may be located separate from the replicated table data layer. In yet other implementations, the system may not include a Unique ID Lookup Table, and instead the single replicated data table may include an ID column that includes, for each row of the single replicated data table, the unique ID of that row as it is in the source data table. In any of these cases, information is maintained by the system that links the rows of the single replicated data table to the original unique IDs of the data table, such that the correct unique IDs can be associated with the relevant rows for the final query response, as described herein.

FIG. 9 illustrates example permissions, according to various implementations of the present disclosure, and in particular the present example implementation. The permissions of FIG. 9 are provided as an example and for illustrative purposes, however in various implementations permissions may be structured differently than in the example shown. The example permissions of FIG. 9 assume, as described above, that users are associated with group access permissions and sensitivity permissions. Further, the example permissions of FIG. 9 assume, as described above, that the sensitivity permissions are structured hierarchically, such that each higher level of sensitivity permissions includes all permissions of the levels below. In other implementations, the sensitivity permissions may not be structured hierarchically. As shown in the permissions table of FIG. 9, each user of the system (listed in column 902), is associated with group access permissions (listed in column 904) and sensitivity permissions (listed in column 906). Differing somewhat from the example permissions of FIG. 4, in the example permissions of FIG. 9, sensitivity permissions, in combination with group access permissions, associated with users may be further defined such that each user has access to every row of the data table at exactly one sensitivity level. Thus, for each user, sensitivity permissions are defined, for each user, for all groups in the data table. For example, in row 908 the permissions for user 2 are defined such that user 2 has sensitivity level permission $P_1$ for group $G_1$, and sensitivity level permission $P_2$ for groups $G_2$ and $G_3$. Similarly, in row 910 the permissions for user 5 are defined such that user 5 has sensitivity level permission $P_2$ for group $G_3$, and sensitivity level permission $P_0$ for groups $G_1$ and $G_2$. Note that the effect of this permissioning scheme is the same as that of the permissioning scheme of FIG. 4, but is further defined for the purpose of clarifying, for each row of the single replicated data table, whether a user has access to that row or not.

As an example, user 5, having sensitivity level permission $P_2$ for group $G_3$, would have access to the group $G_3$ rows of replicated set of rows 810, of the single replicated data table of FIG. 8, but not group $G_3$ rows of any of the other replicated sets of rows (e.g., 806 or 808). User 5, further, having sensitivity level permission $P_0$ for groups $G_1$ and $G_2$, would have access to the group $G_1$ and $G_2$ rows of replicated set of rows 806, of the single replicated data table of FIG. 8, but not group $G_1$ and $G_2$ rows of any of the other replicated sets of rows (e.g., 808 or 810).

Figure 10:
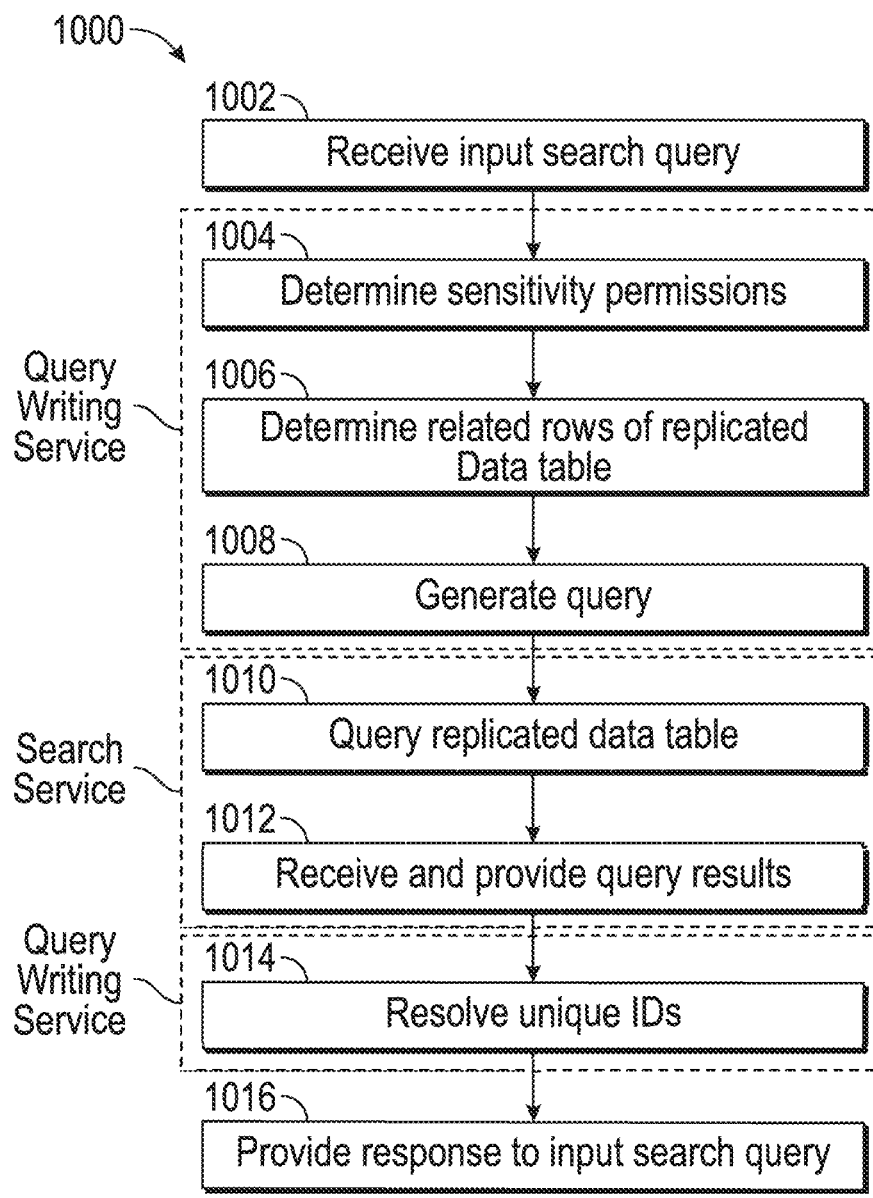
FIG. 10 is a flowchart illustrating another example method and functionality, according to various implementations of the present disclosure.

FIG. 10 is a flowchart 1000 illustrating an example method and functionality of the system, according to various implementations of the present disclosure, including at least the present example implementation. Below, operation of the system, according to the present example implementation, will be generally described in reference to the flowchart 1000 of FIG. 10, and for clarity specific examples will be provided based on the example permissions of FIG. 9 (described above) and the example replicated table data layer 114 of FIG. 8 (described above). Certain aspects of the operation of the system as illustrated in the flowchart 1000 are similar to the operation of the system as illustrated in the flowchart 500 of FIG. 5, and thus they will not be repeated here, however it is to be understood that such functionality applies equally to the present example implementation. In various implementations, and as described below, various blocks of the methods described below may be optional, and/or the blocks may occur in different orders.

Referring to flowchart 1000 of FIG. 10, in the present example implementation, the system includes a query writing service 110 that, at block 1002, receives an input search query 120 associated with the data table from a user (or device, and/or the like). At block 1004, the query writing service 110 determines sensitivity level permissions associated with the input search query (e.g., based on information requested in the query, the user, the user's role, a device, an account, one or more attributes, metadata associated with data of the system, the like, and/or combinations of the foregoing and/or other information as described herein), and, at block 1006, determined related rows of the single replicated data table of the replicated table data layer 114. Such rows may be determined based on the sensitivity level associated with the query, in a manner analogous to that of identifying a replicated data table in the first example implementation described above. For example, the relevant replicated set of rows may be identified based on the details of the input search query and the user's permissions, among other features.

At block 1008, the query writing service 110 generates one or more new queries (generally referred to herein as a "replicated-data-table query") based on the determined sensitivity permissions and the determining related rows of the single replicated data table. The replicated-data-table query includes at least an identification of the particular replicated set of rows (e.g., one or more of replicated set of rows 806, 808, and 810) associated with the determined sensitivity level permissions. For example, if the input search query 120 requests information found in data $D_1$, which data is associated with sensitivity level $S_1$, the query writing service 110 may generate a replicated-data-table query that refers to replicated set of rows 808. As noted above, sensitivity permissions, in combination with group access permissions, associated with users may be defined such that each user has access to every row of the data table at exactly one sensitivity level. Accordingly, the query writing service 110 may generate the replicated-data-table query for the applicable rows of the replicated table data layer.

Alternatively, or in addition, the system may determine sensitivity permissions associated with the requesting user, and may confirm whether the requesting user has a sufficient sensitivity level permission to access the data to be queried. If not, no replicated-data-table query may be generated.

At block 1010, the replicated-data-table query is then passed to the search service 112, which search service 112 then executes that query on the replicated table data layer. At block 1012, results of the replicated-data-table query are received by the search service 112, and passed back to the query writing service 110.

At block 1014, the query writing service 110 then combines or aggregates the results of the replicated-data-table query, if needed, and restores unique identifiers associated with each of the rows of the combined/aggregated results if needed. For example, the query writing service may cause a query of the Unique ID Lookup Table to restore unique identifiers associated with each of the rows of the results of the replicated-data-table query. Alternatively, the replicated data table may include an additional column of data that includes the unique identifiers, and restoration of the unique identifiers by the query writing service may therefore be built in to the response provided from the replicated table data layer by the search service 112. At block 1016 the query writing service 110 provides a response to the input search query 120. As described above, the provided response to the input search query 120 is structured as if the original data table itself was directly queried.

In the present example implementation, as described above, any applicable group access permissions are enforced by the search service 112 as they would be if the data table were being queried directly. Thus, for example, when the search service 112 executes a replicated-data-table query on a replicated data table, existing group access permissioning provided by the search service 112 is still in effect such that the querying user is only permitted access to rows of the table corresponding to groups for which the user has access. Accordingly, the query writing service 110 enables sensitivity permissioning by way of the replicated table data layer 114 and generation of replicated-data-table queries, and the search service 112 provides existing group access permissioning. As noted above, each cell of the various data tables need not be permissioned separately.

Effectively, the present example implementation would provide query results similar to, or the same as, those described above in reference to FIGS. 6A-6C. However, differing from the descriptions of those figures, the optional further generated queries of FIGS. 6B and 6C would not be necessary, and the query responses would comprise those with the enriched information (e.g., in reference to FIG. 6B, the user 5 response with the 620 information, and in reference to FIG. 6C, the user 2 and user 5 responses with the additional data, such as not the responses that are the same as user 1). Thus, advantageously, according to certain versions, the second example implementation does not require multiple replicated-data-table queries or data enrichment, as required by the first example implementation. Accordingly, the second example implementation may provide efficiency and performance benefits over the first example implementation. Thus, while the FIGS. 6A-6C illustrate example operation of the system, according to various implementations of the present disclosure, including at least the present example implementation.

Further, advantageously, according to various implementations, due to the functionality of the query writing service 110, a user of the system may not be aware that there is anything other than the data table being queried. In other words, the query writing service 110 may, invisibly from the perspective of the user, handle translating input search queries to function with the replicated table data layer 114 (e.g., by way of the search service 112), and then translating results from queries of the replicated table data layer back to what would be expected of a user who believes they are only querying the data table directly. Further, as described above, the combination of the functionality of the query writing service 110 and the replicated table data layer 114 enables the system to function with an existing search service 112. In combination, the various aspects of the system, according to various implementations, provides efficient and improved querying and permissioning (including group access permissions and sensitivity permissions) of specific portions of a data table.

VI. Additional Example Implementations

The following is a list of example numbered implementations. The features recited in the below list of example implementations can be combined with additional features disclosed herein. Furthermore, additional inventive combinations of features are disclosed herein, which are not specifically recited in the below list of example implementations and which do not include the same features as the specific implementations listed below. For sake of brevity, the below list of example implementations does not identify every inventive aspect of this disclosure. The below list of example implementations is not intended to identify key features or essential features of any subject matter described herein.

Example Implementation 1. A computer-implemented method of data permissioning, the method comprising:
  by one or more processors executing program instructions:
    receiving an input search query associated with a data table;
    determining sensitivity permissions associated with the input search query;
    based on the determined sensitivity permissions, generating a replicated-data-table query;
    providing the replicated-data-table query to a search service for execution of the replicated-data-table query on a replicated table data layer generated based on the data table;
    receiving a response from the search service including results of the replicated-data-table query; and
    providing a response to the input search query based on at least the results of the replicated-data-table query.

Example Implementation 2. The computer-implemented method of Example Implementation 1 further comprising:
  by the one or more processors executing program instructions:
    generating the replicated table data layer, wherein generating the replicated table data layer comprises:
      determining sensitivity levels associated with the data table;
      generating two or more replicated data tables, wherein:
        a first replicated data table of the two or more replicated data tables corresponds to a first sensitivity level of the determined sensitivity levels, and
        a second replicated data table of the two or more replicated data tables corresponds to a second sensitivity level of the determined sensitivity levels.

Example Implementation 3. The computer-implemented method of Example Implementation 2, wherein generating the replicated table data layer further comprises:
  associating first sensitivity level permissions, corresponding to the first sensitivity level, with the first replicated data table; and
  associating second sensitivity level permissions, corresponding to the second sensitivity level, with the second replicated data table.

Example Implementation 4. The computer-implemented method of Example Implementation 3, wherein each of the two or more replicated data tables comprises a schema that overlaps or extends that of the data table.

Example Implementation 5. The computer-implemented method of Example Implementation 4, wherein:
  the data table comprises a plurality of columns,
  at least a first set of columns of the plurality of columns is associated with the first sensitivity level,
  at least a second set of columns of the plurality of columns is associated with the second sensitivity level, and
  generating the replicated table data layer further comprises:
    in the first replicated data table associated with the first sensitivity level permissions, setting data values of the second set of columns to null values; and
    in the second replicated data table associated with the second sensitivity level permissions, setting data values of the second set of columns to match those of the data table.

Example Implementation 6. The computer-implemented method of Example Implementation 1, wherein the replicated table data layer comprises:
  two or more replicated data tables, wherein:
    a first replicated data table of the two or more replicated data tables corresponds to a first sensitivity level of a plurality of sensitivity levels associated with the data table, and
    a second replicated data table of the two or more replicated data tables corresponds to a second sensitivity level of the plurality of sensitivity levels associated with the data table.

Example Implementation 7. The computer-implemented method of Example Implementation 6, wherein:
  first sensitivity level permissions, corresponding to the first sensitivity level, are associated with the first replicated data table, and
  second sensitivity level permissions, corresponding to the second sensitivity level, are associated with the second replicated data table.

Example Implementation 8. The computer-implemented method of Example Implementation 7, wherein:
  each of the two or more replicated data tables comprises a schema that overlaps or extends that of the data table,
  the data table comprises a plurality of columns,
  at least a first set of columns of the plurality of columns is associated with the first sensitivity level,
  at least a second set of columns of the plurality of columns is associated with the second sensitivity level,
  in the first replicated data table associated with the first sensitivity level permissions, data values of the second set of columns are set to null values, and
  in the second replicated data table associated with the second sensitivity level permissions, data values of the second set of columns match those of the data table.

Example Implementation 9. The computer-implemented method of Example Implementation 8, wherein:
  the determined sensitivity permissions include the first sensitivity level permissions, and
  wherein generating the replicated-data-table query comprises:
    determining to query the first replicated data table; and
    including, in the replicated-data-table query, a query of the first replicated data table.

Example Implementation 10. The computer-implemented method of Example Implementation 8, wherein:
  the determined sensitivity permissions include the first and second sensitivity level permissions, and
  wherein generating the replicated-data-table query comprises:
    determining to query the first and second replicated data tables; and
    including, in the replicated-data-table query, queries of the first and second replicated data tables.

Example Implementation 11. The computer-implemented method of Example Implementation 8 further comprising:
  by the one or more processors executing program instructions:

based on the results of the replicated-data-table query, and further based on the sensitivity permissions, generating a second replicated-data-table query;

providing the second replicated-data-table query to the search service for execution of the second replicated-data-table query on the replicated table data layer;

receiving a second response from the search service including results of the second replicated-data-table query; and aggregating the results of the replicated-data-table query and the results of the second replicated-data-table query, wherein the response to the input search query is further based on at least the results of the replicated-data-table query and the results of the second replicated-data-table query.

Example Implementation 12. The computer-implemented method of Example Implementation 11, wherein:

the replicated-data-table query includes a query of the first replicated data table associated with the first sensitivity level, and the second replicated-data-table query includes a query of the second replicated data table associated with the second sensitivity level.

Example Implementation 13. The computer-implemented method of Example Implementation 12, wherein the second replicated-data-table query includes primary keys associated with results of the replicated-data-table query.

Example Implementation 14. The computer-implemented method of Example Implementation 13, wherein aggregating the results of the replicated-data-table query and the results of the second replicated-data-table query comprises:

joining the results of the replicated-data-table query and the results of the second replicated-data-table query into a single table; and associating, with corresponding rows of the single table, unique identifiers matching those of the corresponding rows from the data table.

Example Implementation 15. The computer-implemented method of Example Implementation 1, wherein the sensitivity permissions comprise a hierarchical set of sensitivity permissions.

Example Implementation 16. The computer-implemented method of Example Implementation 1, wherein the sensitivity permissions are associated with a user providing the input search query.

Example Implementation 17. A computer-implemented method of data permissioning, the method comprising:

by one or more processors executing program instructions:

receiving an input search query associated with a data table;

determining sensitivity permissions associated with the input search query;

based on the determined sensitivity permissions, generating a replicated-data-table query;

providing the replicated-data-table query to a search service for execution of the replicated-data-table query on a replicated table data layer generated based on the data table;

receiving a response from the search service including results of the replicated-data-table query; and providing a response to the input search query based on at least the results of the replicated-data-table query.

Example Implementation 18. The computer-implemented method of Example Implementation 17 further comprising:

by the one or more processors executing program instructions:

generating the replicated table data layer, wherein generating the replicated table data layer comprises:

determining sensitivity levels associated with the data table;

generating a replicated data table including two or more replicated sets of rows, wherein:

a first replicated set of rows of the two or more replicated sets of rows corresponds to a first sensitivity level of the determined sensitivity levels, and a second replicated set of rows of the two or more replicated sets of rows corresponds to a second sensitivity level of the determined sensitivity levels.

Example Implementation 19. The computer-implemented method of Example Implementation 18, wherein generating the replicated table data layer further comprises:

associating first sensitivity level permissions, corresponding to the first sensitivity level, with the first replicated set of rows; and associating second sensitivity level permissions, corresponding to the second sensitivity level, with the second replicated set of rows.

Example Implementation 20. The computer-implemented method of Example Implementation 19, wherein each of the two or more replicated sets of rows comprises a schema that overlaps or extends that of the data table.

Example Implementation 21. The computer-implemented method of Example Implementation 20, wherein:

the data table comprises a plurality of columns, at least a first set of columns of the plurality of columns is associated with the first sensitivity level, at least a second set of columns of the plurality of columns is associated with the second sensitivity level, and generating the replicated table data layer further comprises:

in the first replicated set of rows associated with the first sensitivity level permissions, setting data values of the second set of columns to null values; and in the second replicated set of rows associated with the second sensitivity level permissions, setting data values of the second set of columns to match those of the data table.

Example Implementation 22. The computer-implemented method of Example Implementation 21, wherein each of the sets of replicated rows comprises all of the rows of the data table, or a same number of rows as the number of rows in the data table.

Example Implementation 23. The computer-implemented method of Example Implementation 17, wherein the replicated table data layer comprises:

a replicated data table including two or more replicated sets of rows, wherein:

a first replicated set of rows of the two or more replicated sets of rows corresponds to a first sensitivity level of a plurality of sensitivity levels associated with the data table, and a second replicated set of rows of the two or more replicated sets of rows corresponds to a second sensitivity level of the plurality of sensitivity levels associated with the data table.

Example Implementation 24. The computer-implemented method of Example Implementation 23, wherein:

first sensitivity level permissions, corresponding to the first sensitivity level, are associated with the first replicated set of rows, and second sensitivity level permissions, corresponding to the second sensitivity level, are associated with the second replicated set of rows.

Example Implementation 25. The computer-implemented method of Example Implementation 24, wherein:

each of the two or more replicated sets of rows comprises a schema that overlaps or extends that of the data table, the data table comprises a plurality of columns, at least a first set of columns of the plurality of columns is associated with the first sensitivity level, at least a second set of columns of the plurality of columns is associated with the second sensitivity level, in the first replicated set of rows associated with the first sensitivity level permissions, data values of the second set of columns are set to null values, in the second replicated set of rows associated with the second sensitivity level permissions, data values of the second set of columns match those of the data table, and each of the sets of replicated rows comprises all of the rows of the data table, or a same number of rows as the number of rows in the data table.

Example Implementation 26. The computer-implemented method of Example Implementation 25, wherein:

the determined sensitivity permissions include the first sensitivity level permissions, and wherein generating the replicated-data-table query comprises:

determining to query the first replicated set of rows; and including, in the replicated-data-table query, a query of the first replicated set of rows.

Example Implementation 27. The computer-implemented method of Example Implementation 25, wherein:

the determined sensitivity permissions include the first and second sensitivity level permissions, and wherein generating the replicated-data-table query comprises:

determining to query the first and second replicated sets of rows; and including, in the replicated-data-table query, queries of the first and second replicated sets of rows.

Example Implementation 28. The computer-implemented method of Example Implementation 27 further comprising:

by the one or more processors executing program instructions:

resolving unique identifiers associated with the results of the replicated-data-table query by querying or causing querying of a unique identifier lookup table.

Example Implementation 29. The computer-implemented method of Example Implementation 28, wherein the unique identifier lookup table includes matches between unique identifiers associated with rows of the data table, and corresponding rows of the replicated data table.

Example Implementation 30. The computer-implemented method of Example Implementation 27, wherein the replicated data table includes a column storing unique identifiers matching unique identifiers associated with corresponding rows of the data table.

Example Implementation 31. The computer-implemented method of Example Implementation 30 further comprising:

by the one or more processors executing program instructions:

removing a primary key column from the results of the replicated-data-table query.

Example Implementation 32. The computer-implemented method of Example Implementation 17, wherein the sensitivity permissions are defined for each user with respect to all group access permissions.

Example Implementation 33. The computer-implemented method of Example Implementation 32, wherein the sensitivity permissions comprise a hierarchical set of sensitivity permissions.

Example Implementation 34. The computer-implemented method of Example Implementation 32, wherein the sensitivity permissions are associated with a user providing the input search query.

Example Implementation 35. A system comprising:

a computer readable storage medium having program instructions embodied therewith; and one or more processors configured to execute the program instructions to cause the system to perform the computer-implemented method of any of Example Implementations 1-34.

Example Implementation 36. A computer program product comprising a computer readable storage medium having program instructions embodied therewith, the program instructions executable by one or more processors to cause the one or more processors to perform the computer-implemented method of any of Example Implementations 1-34.

VII. Additional Implementation Details

As described above, the system advantageously provides efficient and improved querying and permissioning of specific portions of a data table, according to various implementations, through replication of the data table, or portions of the data table, and does not require permissioning of each individual cell of the data table. Further, the data table replication, querying, and permissioning techniques of the present disclosure, according to various implementations, advantageously integrate with a wide variety of data table query or search services to provide improved functionality, efficiency, and data permissioning.

Further, advantageously, according to various implementations, sensitivity permissions functionality may be added to an existing computer data system by way of an added query writing service and replicated table data layer. Various implementations of the present disclosure may include the addition of a query writing service, and conversion of a data table to a replicated table data layer, in an existing computer data system to provide improved query efficiency and permissioning functionality (e.g., including sensitivity permissions functionality). Advantageously, according to various implementations, the added query writing service and replicated table data layer may be agnostic to the existing data table querying and group access permissions functionality. Accordingly, the system may advantageously improve the query and permissioning functionality of a wide variety of existing computer data systems, as described herein and according to various implementations.

In some implementations, advantageously, the replicated table data layer comprises multiple replicated data tables, and provides a data organization or structure that, in part, may enable efficient permissioning (including sensitivity permissions functionality) and querying functionality. In some implementations, advantageously, the replicated table data layer comprises a single replicated data table with multiple replicated sets of rows, and provides a data organization or structure that, in part, may enable efficient permissioning (including sensitivity permissions functionality) and querying functionality. Advantageously, certain example implementations may not require multiple replicated-data-table queries or data enrichment, and accordingly, may provide efficiency and performance benefits over other implementations.

Advantageously, according to various implementations, due to the functionality of the query writing service, a user of the system may not be aware that there is anything other than the data table being queried. In other words, the query writing service may, invisibly from the perspective of the user, handle translating input search queries to function with the replicated table data layer (e.g., by way of the search service), and then translating results from queries of the replicated table data layer back to what would be expected of a user who believes they are only querying the data table directly. Further, as described above, the combination of the functionality of the query writing service and the replicated table data layer enables the system to function with an existing search service. In combination, the various aspects of the system, according to various implementations, provides efficient and improved querying and permissioning (including group access permissions and sensitivity permissions) of specific portions of a data table.

Various implementations of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 11:
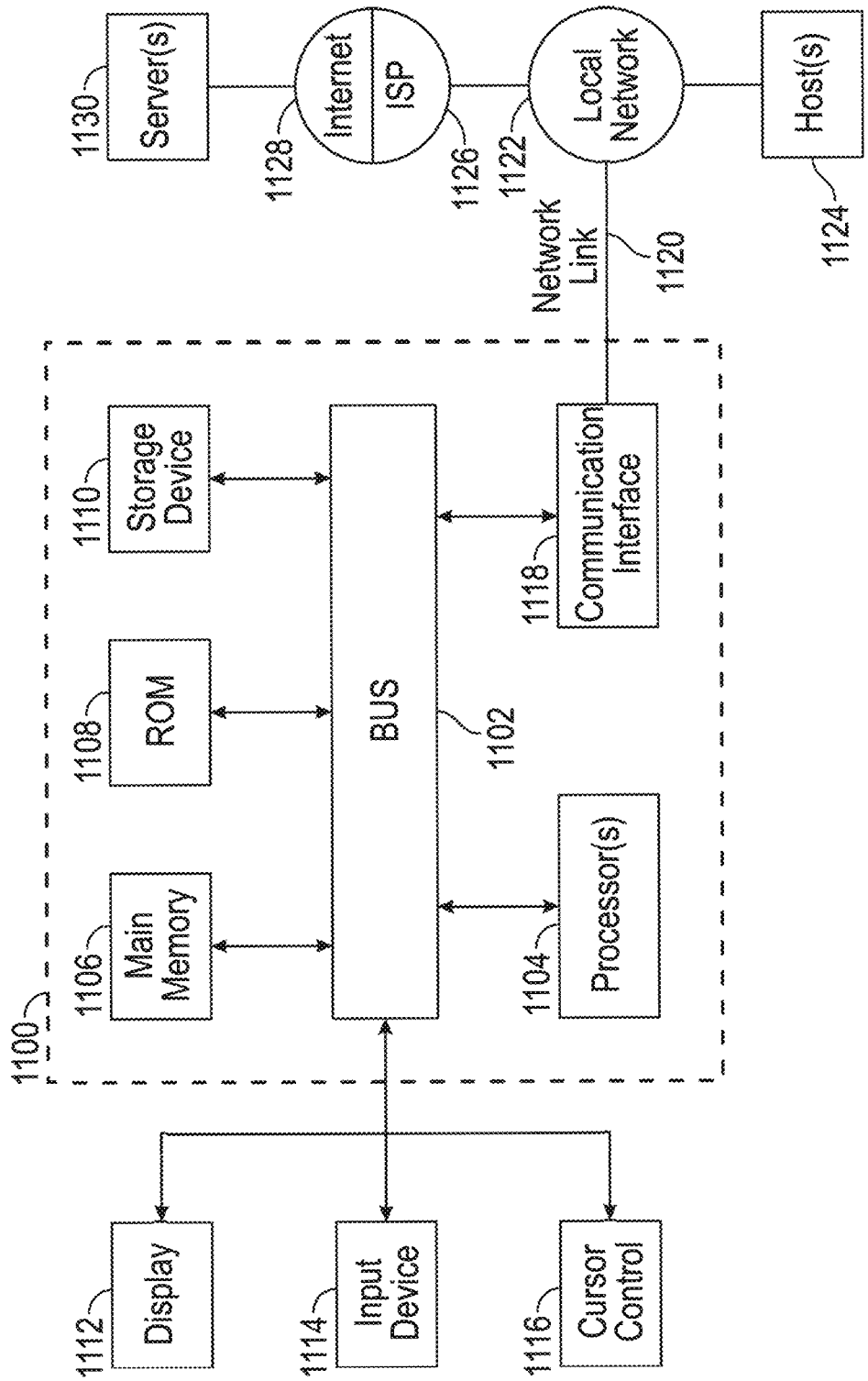
FIG. 11 illustrates a computer system by which certain aspects of the present disclosure may be implemented.

For example, FIG. 11 is a block diagram that illustrates a computer system 1100 upon which various implementations may be implemented (e.g., data querying system 108 may be implemented in computer system 1100). Computer system 1100 includes a bus 1102 or other communication mechanism for communicating information, and a hardware processor, or multiple processors 1104, coupled with bus 1102 for processing information. Hardware processor(s) 1104 may be, for example, one or more general purpose microprocessors.

Computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

Computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 1100 may include a user interface module to implement a GUI that may be stored in a mass storage device as computer executable program instructions that are executed by the computing device(s). Computer system 1100 may further, as described below, implement the techniques described herein using customized hard-wired logic, one or more ASICs or FPGAs, firmware and/or program logic which in combination with the computer system causes or programs computer system 1100 to be a special-purpose machine. According to one implementation, the techniques herein are performed by computer system 1100 in response to processor(s) 1104 executing one or more sequences of one or more computer readable program instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative implementations, hard-wired circuitry may be used in place of or in combination with software instructions.

Various forms of computer readable storage media may be involved in carrying one or more sequences of one or more computer readable program instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN (or WAN component to communicate with a WAN). Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122, and communication interface 1118.

The received code may be executed by processor 1104 as it is received, and/or stored in storage device 1110, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method of data permissioning, the method comprising:
    by one or more processors executing program instructions:
        receiving an input search query associated with a data table;
        determining sensitivity permissions and group access permissions associated with the input search query;
        based on the determined sensitivity permissions and the determined group access permissions, generating a replicated-data-table query;
        providing the replicated-data-table query to a search service for execution of the replicated-data-table query on a replicated table data layer generated based on the data table, wherein:
            the replicated table data layer comprises two or more replicated data tables each associated with different sensitivity levels of a plurality of sensitivity levels associated with the data table,
            each of the two or more replicated data tables includes a different subset of data associated with the applicable sensitivity level of the replicated data table, and
            each of the two or more replicated data tables includes data associated with each of a plurality of group access permissions;
        receiving a response from the search service including results of the replicated-data-table query; and
        providing a response to the input search query based on at least the results of the replicated-data-table query.

2. The computer-implemented method of claim 1 further comprising:
    by the one or more processors executing program instructions:
        generating the replicated table data layer, wherein generating the replicated table data layer comprises:
            determining sensitivity levels associated with the data table; and
            generating the two or more replicated data tables, wherein:
                a first replicated data table of the two or more replicated data tables corresponds to a first sensitivity level of the determined sensitivity levels, and
                a second replicated data table of the two or more replicated data tables corresponds to a second sensitivity level of the determined sensitivity levels.

3. The computer-implemented method of claim 2, wherein generating the replicated table data layer further comprises:
    associating first sensitivity level permissions, corresponding to the first sensitivity level, with the first replicated data table; and
    associating second sensitivity level permissions, corresponding to the second sensitivity level, with the second replicated data table.

4. The computer-implemented method of claim 3, wherein each of the two or more replicated data tables comprises a schema that overlaps or extends that of the data table.

5. The computer-implemented method of claim 4, wherein:
    the data table comprises a plurality of columns,
    at least a first set of columns of the plurality of columns is associated with the first sensitivity level,
    at least a second set of columns of the plurality of columns is associated with the second sensitivity level, and
    generating the replicated table data layer further comprises:
        in the first replicated data table associated with the first sensitivity level permissions, setting data values of the second set of columns to null values; and
        in the second replicated data table associated with the second sensitivity level permissions, setting data values of the second set of columns to match those of the data table.

6. The computer-implemented method of claim 1, wherein:
    a first replicated data table of the two or more replicated data tables corresponds to a first sensitivity level of the plurality of sensitivity levels associated with the data table, and a second replicated data table of the two or more replicated data tables corresponds to a second sensitivity level of the plurality of sensitivity levels associated with the data table.

7. The computer-implemented method of claim 6, wherein:
first sensitivity level permissions, corresponding to the first sensitivity level, are associated with the first replicated data table, and
second sensitivity level permissions, corresponding to the second sensitivity level, are associated with the second replicated data table.

8. The computer-implemented method of claim 7, wherein:
each of the two or more replicated data tables comprises a schema that overlaps or extends that of the data table,
the data table comprises a plurality of columns,
at least a first set of columns of the plurality of columns is associated with the first sensitivity level,
at least a second set of columns of the plurality of columns is associated with the second sensitivity level,
in the first replicated data table associated with the first sensitivity level permissions, data values of the second set of columns are set to null values, and
in the second replicated data table associated with the second sensitivity level permissions, data values of the second set of columns match those of the data table.

9. The computer-implemented method of claim 8, wherein:
the determined sensitivity permissions include the first sensitivity level permissions, and
generating the replicated-data-table query comprises:
determining to query the first replicated data table; and
including, in the replicated-data-table query, a query of the first replicated data table.

10. The computer-implemented method of claim 8, wherein:
the determined sensitivity permissions include the first and second sensitivity level permissions, and
generating the replicated-data-table query comprises:
determining to query the first and second replicated data tables; and
including, in the replicated-data-table query, queries of the first and second replicated data tables.

11. The computer-implemented method of claim 8 further comprising:
by the one or more processors executing program instructions:
based on the results of the replicated-data-table query, and further based on the sensitivity permissions, generating a second replicated-data-table query;
providing the second replicated-data-table query to the search service for execution of the second replicated-data-table query on the replicated table data layer;
receiving a second response from the search service including results of the second replicated-data-table query; and
aggregating the results of the replicated-data-table query and the results of the second replicated-data-table query,
wherein the response to the input search query is further based on at least the results of the replicated-data-table query and the results of the second replicated-data-table query.

12. The computer-implemented method of claim 11, wherein:

the replicated-data-table query includes a query of the first replicated data table associated with the first sensitivity level, and
the second replicated-data-table query includes a query of the second replicated data table associated with the second sensitivity level.

13. The computer-implemented method of claim 12, wherein the second replicated-data-table query includes primary keys associated with results of the replicated-data-table query.

14. The computer-implemented method of claim 13, wherein aggregating the results of the replicated-data-table query and the results of the second replicated-data-table query comprises:
joining the results of the replicated-data-table query and the results of the second replicated-data-table query into a single table; and
associating, with corresponding rows of the single table, unique identifiers matching those of the corresponding rows from the data table.

15. The computer-implemented method of claim 1, wherein the sensitivity permissions comprise a hierarchical set of sensitivity permissions.

16. The computer-implemented method of claim 1, wherein the sensitivity permissions are associated with a user providing the input search query.

17. A system comprising:
a computer readable storage medium having program instructions embodied therewith; and
one or more processors configured to execute the program instructions to cause the system to:
receive an input search query associated with a data table;
determine sensitivity permissions and group access permissions associated with the input search query;
based on the determined sensitivity permissions and the group access permissions, generate a replicated-data-table query;
provide the replicated-data-table query to a search service for execution of the replicated-data-table query on a replicated table data layer generated based on the data table, wherein:
the replicated table data layer comprises two or more replicated data tables each associated with different sensitivity levels of a plurality of sensitivity levels associated with the data table,
each of the two or more replicated data tables includes a different subset of data associated with the applicable sensitivity level of the replicated data table, and
each of the two or more replicated data tables includes data associated with each of a plurality of group access permissions;
receive a response from the search service including results of the replicated-data-table query; and
provide a response to the input search query based on at least the results of the replicated-data-table query.

18. The system of claim 17, wherein the one or more processors are further configured to execute the program instructions to cause the system to:
generate the replicated table data layer, wherein generating the replicated table data layer comprises:
determining sensitivity levels associated with the data table; and
generating the two or more replicated data tables, wherein:

a first replicated data table of the two or more replicated data tables corresponds to a first sensitivity level of the determined sensitivity levels, and a second replicated data table of the two or more replicated data tables corresponds to a second sensitivity level of the determined sensitivity levels.

19. The system of claim 18, wherein generating the replicated table data layer further comprises:

associating first sensitivity level permissions, corresponding to the first sensitivity level, with the first replicated data table; and associating second sensitivity level permissions, corresponding to the second sensitivity level, with the second replicated data table.

20. The system of claim 19, wherein:

the data table comprises a plurality of columns, at least a first set of columns of the plurality of columns is associated with the first sensitivity level, at least a second set of columns of the plurality of columns is associated with the second sensitivity level, and generating the replicated table data layer further comprises:

in the first replicated data table associated with the first sensitivity level permissions, setting data values of the second set of columns to null values; and in the second replicated data table associated with the second sensitivity level permissions, setting data values of the second set of columns to match those of the data table.

\* \* \* \* \*